(12) United States Patent
Ohama et al.

(10) Patent No.: US 7,604,228 B2
(45) Date of Patent: Oct. 20, 2009

(54) DOCUMENT FEEDER

(75) Inventors: Takashi Ohama, Iwakura (JP); Yoshinori Osakabe, Seto (JP); Toshitaka Iwago, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 308 days.

(21) Appl. No.: 11/074,081

(22) Filed: Mar. 8, 2005

(65) Prior Publication Data

US 2005/0212195 A1 Sep. 29, 2005

(30) Foreign Application Priority Data

Mar. 8, 2004 (JP) ............................. 2004-064656

(51) Int. Cl.
*G03G 15/00* (2006.01)
*G03G 21/00* (2006.01)
*B65H 5/22* (2006.01)

(52) U.S. Cl. ..................... 271/3.14; 271/121; 271/4.01; 399/367; 399/124; 399/125

(58) Field of Classification Search .................. 399/367, 399/369; 271/3.14, 4.01, 4.05, 4.07, 4.11, 271/128, 121, 220, 264
See application file for complete search history.

(56) References Cited

U.S. PATENT DOCUMENTS

| | | | | |
|---|---|---|---|---|
| 4,540,166 A * | 9/1985 | Massengeil et al. | ........ | 271/3.01 |
| 4,739,376 A * | 4/1988 | Kanekol | ...................... | 355/75 |
| 4,851,885 A * | 7/1989 | Kurosaki | ..................... | 399/367 |
| 4,884,097 A * | 11/1989 | Giannetti et al. | ............... | 355/23 |
| 5,412,462 A * | 5/1995 | Matsuo et al. | ............... | 399/367 |
| 5,731,885 A | 3/1998 | Nagahara | | |
| 5,825,513 A * | 10/1998 | Hasegawa | ................... | 358/498 |
| 6,206,368 B1 * | 3/2001 | Kobayashi et al. | .......... | 271/273 |
| 6,648,320 B2 * | 11/2003 | Iino et al. | .................. | 271/3.15 |
| 6,915,102 B2 * | 7/2005 | Aoki et al. | ................... | 399/367 |
| 7,212,321 B2 | 5/2007 | Sugiyama et al. | | |
| 7,379,700 B2 * | 5/2008 | Iwata | ......................... | 399/367 |
| 2001/0017438 A1 | 8/2001 | Takamtsu | | |
| 2002/0030321 A1 | 3/2002 | Sugiyama et al. | | |
| 2004/0062579 A1 * | 4/2004 | Iwago et al. | ................ | 399/367 |
| 2004/0071486 A1 * | 4/2004 | Manabe et al. | ............. | 399/367 |
| 2005/0058477 A1 * | 3/2005 | Aoki et al. | .................. | 399/367 |

FOREIGN PATENT DOCUMENTS

JP A-63-247258 10/1988

(Continued)

*Primary Examiner*—Patrick H Mackey
*Assistant Examiner*—Luis Gonzalez
(74) *Attorney, Agent, or Firm*—Oliff & Berridge, PLC

(57) ABSTRACT

A document feeder includes a substantially U-shaped document transporting pathway with an upper feeding tray and a lower discharging tray, a separating-transporting device including a first rotation driving member and a first contacting member, a reverse transporting device including a second rotation driving member and a second contacting member and a pathway cover, which includes at least the second contacting member among the first and second contacting members, and capable of rotating about a rotational shaft closer to the discharging tray than the feeding tray. When the pathway cover is opened, at least the second contacting member of the first and second contacting members is separated from the second rotation member and at least a part of the document transporting pathway is exposed.

25 Claims, 14 Drawing Sheets

FOREIGN PATENT DOCUMENTS

| | | |
|---|---|---|
| JP | U-01-070759 | 5/1989 |
| JP | A-02-502715 | 8/1990 |
| JP | A-04-159957 | 6/1992 |
| JP | A-05-077962 | 3/1993 |
| JP | A-06-343123 | 12/1994 |
| JP | A-09-240851 | 9/1997 |
| JP | A-10-167513 | 6/1998 |
| JP | A-2001-130782 | 5/2001 |
| JP | A-2001-151370 | 6/2001 |
| JP | A-2001-233491 | 8/2001 |
| JP | A 2001-354328 | 12/2001 |
| JP | A-2002-193472 | 7/2002 |
| JP | A 2002-368953 | 12/2002 |
| JP | A 2003/069788 | 3/2003 |
| JP | A 2003-076074 | 3/2003 |
| JP | A-2003-128299 | 5/2003 |
| JP | A 2003-298811 | 10/2003 |
| JP | A 2002-335372 | 11/2003 |

* cited by examiner

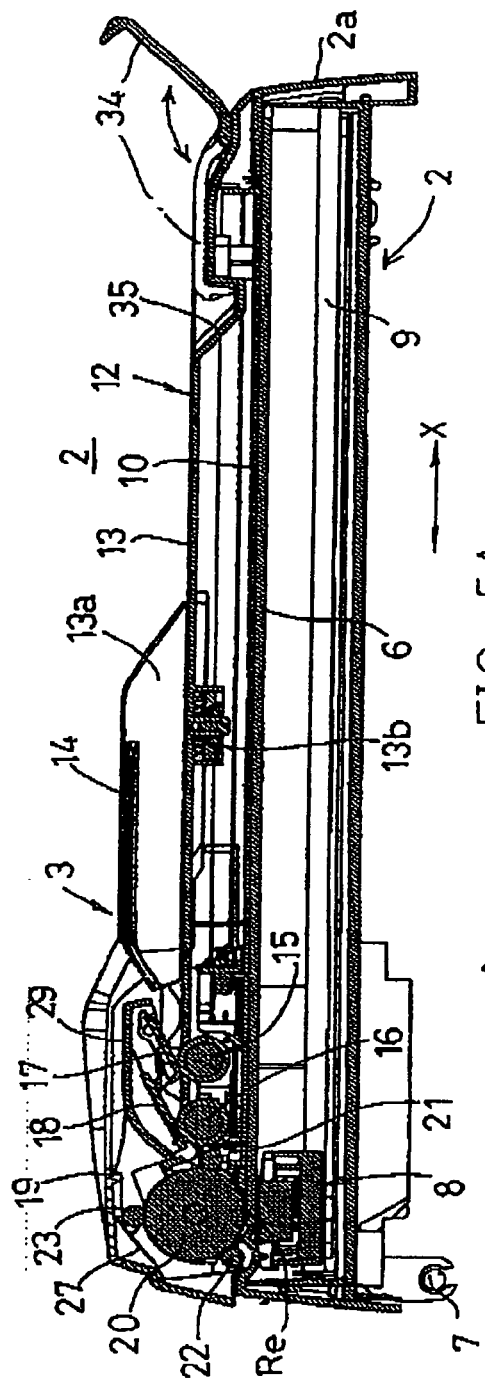
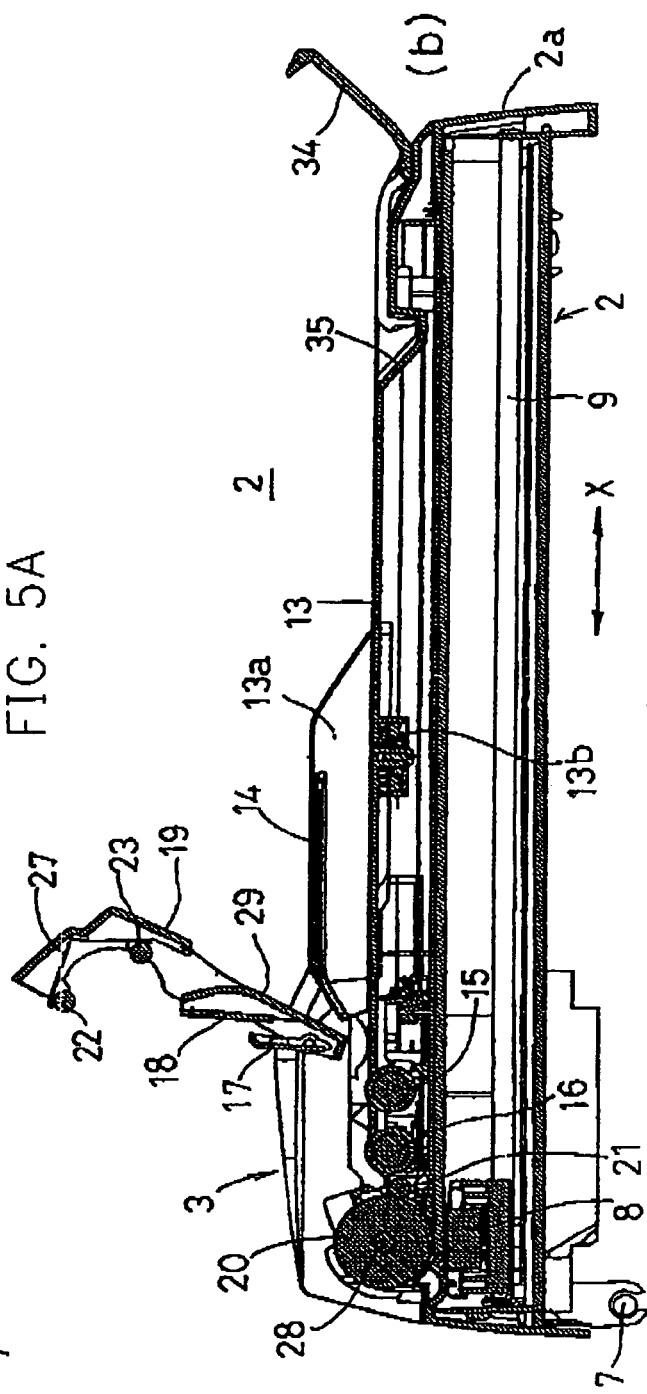
FIG. 5A
FIG. 5B

DOCUMENT FEEDER

CROSS-REFERENCE TO RELATED APPLICATION

This application claims priority from Japanese Patent Application No. 2004-064656, filed on Mar. 8, 2004, the subject matter of which is incorporated herein its entirety by reference thereto.

BACKGROUND OF THE INVENTION

1. Field of the Invention

The present invention relates to a document feeder provided to an image reader having a reading device that reads an image, at a reading position, from a document that is being conveyed. The present invention particularly relates to a thin document feeder having a substantially U-shaped document transporting pathway for conveying the document from a sheet feeding portion to a sheet discharging portion through the reading position.

2. Description of the Related Art

There is an imaging reader that is capable of reading an image recording surface of a stationary document and a moving document. Such the image reader is generally provided with two kinds of transparent plates (glass plates) for reading a stationary document and a moving document, on a body of the image reader. To read a stationary document, a document is placed on one of the transparent plates (flatbed type) and is pressed by a cover capable of opening and closing with respect to the body of the image reader. The document is then read by an image scanner (an image reading device) moving along an underside of the transparent plate (flatbed type). In the case of reading a moving document, a plurality of documents stacking on a feeding tray is separated one by one by an automatic document feeder (ADF) disposed on the cover, and is conveyed to the transparent plate. After the image recording surface is read by the image reading device halting under the transparent plate, the document is discharged to a discharging tray.

The document transporting pathway may be generally provided in automatic document feeders. One type of the ADFs may be an upper feeding type, for example, disclosed in Japanese Patent Laid-Open Patent Publication No. 2003-76074 (FIG. 1). This type of the ADF has a substantially U-shaped document transporting pathway that extends from a sheet feeding portion located at the upper side to a discharging portion located at the lower side, through a document reading position. Another type of the ADFs may be a lower feeding type, for example, disclosed in Japanese Laid-Open Patent Publication No. 2002-335372 (FIG. 1). This type of the ADF has a substantially U-shaped document transporting pathway that extents from a sheet feeding portion located at the lower side to a discharging portion located at the upper side, through a document reading position.

In the ADF disclosed in JP2003-76074, a pickup roller, a separating roller and first and second pairs of transporting rollers are disposed at positions upstream from the document reading position (the upper side of the body of the ADF) with respect to the document conveying direction in the substantially U-shaped document transporting pathway. A single transporting roller is disposed on an upper cover that is capable of rotating and opening the upper side (the feeding portion side) of the ADF. If paper jam occurs in the document transporting pathway, the upper cover is opened to remove the paper. In the JP2002-335372, there is no measures for removing jammed paper.

SUMMARY OF THE INVENTION

According to the structure disclosed in JP2003-76074, even if the upper cover is opened, only one roller is separated from the document transporting pathway. Since an operator is difficult to reach with his/her hands to the locations of a driving roller and a following roller that are disposed at positions downstream from the reading position, the rollers are rotated to convey the document to the discharging side when the paper jam occurs. However, the jammed paper is not always removed by the above structure. A forcible pulling of the jammed paper may cause the document to be torn or be damaged. Moreover, it is extremely difficult to remove the remaining portion of the torn document in the document transporting pathway.

The invention provides a document to be used for a document reading device, wherein the document feeder has a substantially U-shaped document transporting pathway and include a sheet feeding portion and a discharging chute that is located above the sheet feeding portion.

According to one aspect of the invention, a document feeder provided on an image reader having a reading device that reads an image of a document of a plurality of documents at a reading position is provided, wherein the document is being conveyed in a predetermined conveying direction. The document feeder includes a substantially U-shaped document transporting pathway, through which the document can pass from a feeding tray to a discharging tray, which is provided above the feeding tray, via the reading position. The substantially U-shaped document transporting pathway includes a first path, in which the document is conveyed in a first transportation direction; and a second path, in which the document is conveyed in a second transportation direction that is opposite to the first transportation direction. The document feeder further includes a separating-transporting device that separates one of the plurality of documents stacked on the feeding tray and conveys the separated document in the first transportation direction; a reverse transporting device that conveys the document, which is conveyed by the separating-transporting device, in the second transportation direction; and an openable pathway cover that is disposed at a location distance from the reverse transporting device and defines at least a part of the substantially U-shaped document transporting pathway. The pathway cover is capable of rotating about a rotational shaft that is provided closer to the discharging tray than the feeding tray and is capable of exposing at least the part of the substantially U-shaped document transporting pathway. The separating-transporting device includes a first rotation driving member and a first contacting member, which are capable of being contacted with each other with flexibility. The reverse transporting device includes a second rotation driving member and a second contacting member, which are capable of being contacted with each other with flexibility. The pathway cover includes at least the second contacting member among the first and second contacting members. When the pathway cover is closed, the first contacting member and the second contacting member are contacted with the first rotation driving member and the second rotation driving member, respectively, with flexibility. When the pathway cover is opened, at least a portion of the second contacting member is separated from the second rotation driving member.

With this structure, when the pathway cover is opened, at least the portion of the second contacting member can be separated from the second rotation driving member, so that at least the part of the substantially U-shaped document transporting pathway can be exposed. Thus, the contact between the first rotation driving member and the first contacting member and between the second rotation driving member and the second contacting member can be released, so that a jammed document can be easily removed.

BRIEF DESCRIPTION OF THE DRAWINGS

FIG. 5A is a cross-sectional view along line Va-Va of FIG. 2.

FIG. 5B is a cross-sectional view along line Vb-Vb of FIG. 4.

DETAILED DESCRIPTION OF EMBODIMENTS

Figure 1:
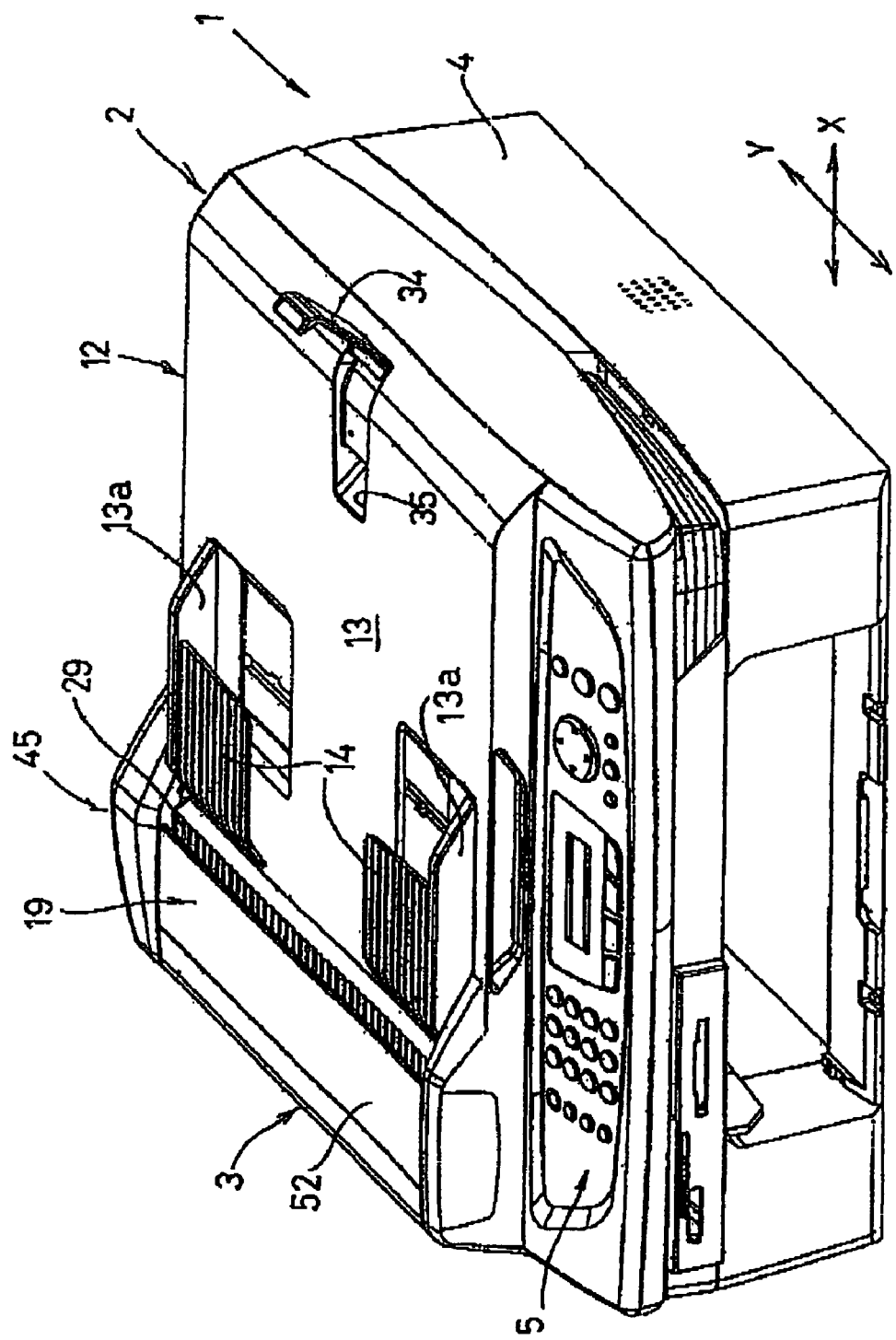
FIG. 1 is a perspective view of a multi-function apparatus with a document feeder of an exemplary embodiment the present invention.

Exemplary embodiments for practicing the present invention will be explained with referring to the drawings.

The embodiments of the present invention are applied to an image reader 2 and a document feeder 3 that are provided in a multi-function apparatus 1 having the functions of faxing, scanning, copying and printing. Throughout the specification, the near side in FIG. 1 is referred to as the front of the multi-function apparatus 1. The far side, which is opposite to the near side, in FIG. 1 is referred to as the rear or back of the multi-function apparatus 1. The right side in FIG. 1 is referred to as the right side of the multi-function apparatus 1. The left side in FIG. 1 is referred to as the left side of the multi-function apparatus 1.

Figure 2:
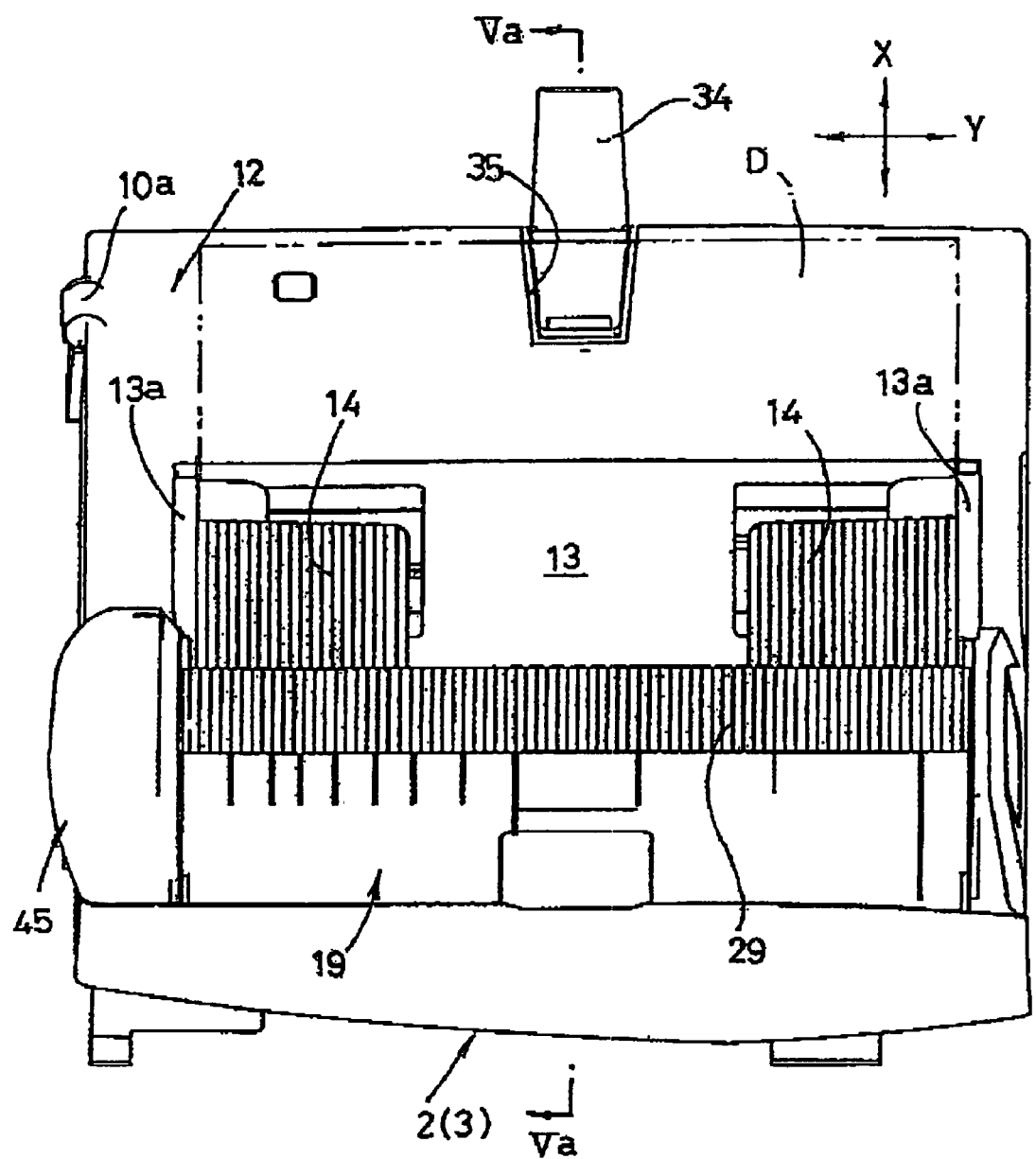
FIG. 2 is a plan view of the multi-function apparatus of FIG. 1.
Figure 3:
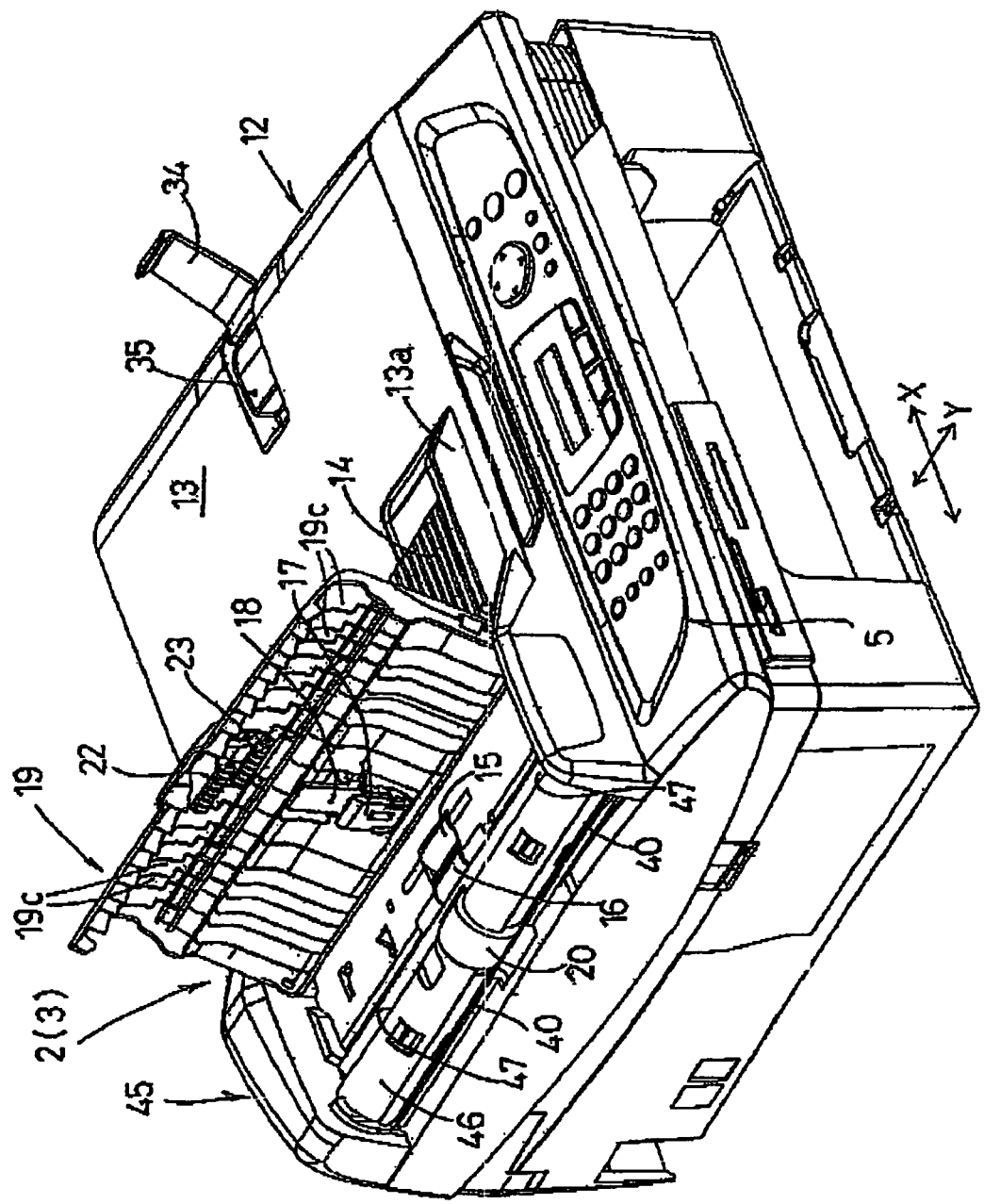
FIG. 3 is a perspective view of the multi-function apparatus when the pathway cover of the document feeder is opened.

As shown in FIGS. 1 and 2, an operation panel 5 having a ten key for executing the faxing, scanning, copying or printing function, buttons and keys for commanding various operations, and an LCD panel for displaying, for example, command contents or error messages, is arranged on an upper surface of a body case 4 of the multi-function apparatus 1. The image reader 2 for implementing the scanning function and the document feeder 3 are disposed at the back of the operation panel 5. As shown in FIGS. 5A and 5B, a glass plate 6 is arranged on a case 2a of the image reader 2 for serving as a transparent plate for a stationary document and for a moving document. The glass plate 6 serves as a first transparent and a second transparent member. A linear-shaped reading device 8, for example, a contact image sensor (CIS) for reading an image recording surface of a document is disposed under the glass plate 6. The linear-shaped reading device 8 is mounted on a guiding shaft 9. The guiding shaft 9 having a linear-shape extends in an X direction in FIG. 1 such that the reading device 8 is capable of reciprocating thereon. The reading device 8 has a rectangular body and is disposed such that its longer sides extend in a Y direction in FIG. 1.

The case 2a of the image reader 2 is capable of pivoting upward and downward about a pivot 7 (referring to FIGS. 5A and 5B) that is horizontally arranged on the body case 4 at one side of the case 2a (the left side of FIGS. 1 and 2 in the embodiments).

Figure 4:
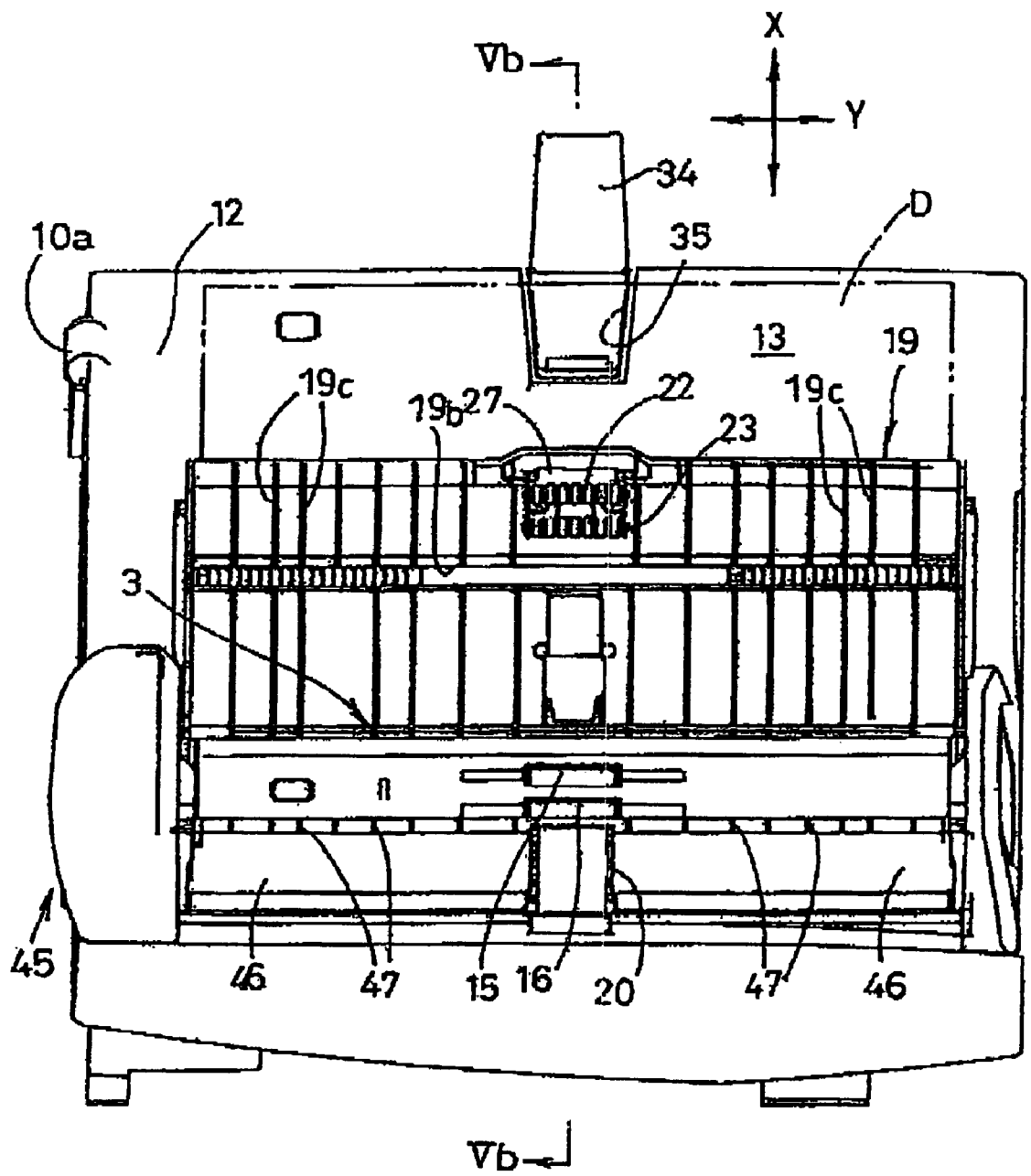
FIG. 4 is a plan view of the multi-function apparatus when the pathway cover of the document feeder is opened.

The document feeder (automatic document feeder, ADF) 3 for conveying a document to the image reader 2 is disposed above a pressing plate 10 (which functions as the second pressing member). The pressing plate 10 contacts an image recording surface of the document with the glass plate 6 and presses the stationary document. The synthetic resin pressing plate 10 is pivotable upward and downward with respect to the case 2a about a hinge 10a (only one hinge is shown in FIGS. 2 and 4) located at a rear end of the pressing plate 10 (i.e. at the side oppose to the operation panel 5). A pressing body (not shown) including a sponge or a white plate etc. may also be attached to the lower surface of the pressing plate 10.

As shown in FIGS. 5A, 5B, 6 and 7, in the left part of the glass plate 6 where the reading device 8 is positioned, a document exposing portion is provided. The document exposing portion has an opening 36 for exposing a portion of the down-facing image recording surface of the document D to be conveyed in a first transportation direction (described latter) is provided at the left of a guiding plate 11 attached on the glass plate 6. The guiding plate 11 extends in the Y direction. A position above a detection position of the CIS also refers to a reading position Re at which a document that is being conveyed is read. The right part of the glass plate 6 with respect to the guiding plate 11, which extends in the Y direction and is attached to the glass plate 6, refers to a reading area of the stationary document. The reading device 8 serves as first and second reading devices.

The document feeder 3 according to a first embodiment of the present invention is disposed adjacent to a feeding tray 13 and a discharging tray 14, as shown in FIGS. 1 to 7. The feeding tray 13 is formed on an upper cover 12 covering substantially the entire body of the pressing plate 10. The discharging tray 14 is disposed at a position that is higher than the feeding tray 13. The discharging tray 14 is shorter than the feeding tray 13 in the X direction. The document feeder 3 has a substantially U-shape document transporting pathway that includes a first path, in which a document D is conveyed in a first direction, and a second path, in which the document D is conveyed in a second direction. The first direction is referred to a direction which the document D is conveyed from the feeding tray 14 to the reading position Re (FIGS. 5A and 6) located at one side of the feeding tray 13 (i.e. one side in the X direction), and the second direction is referred to a direction which the document D is conveyed from the reading position Re to the discharging tray 14. The discharging tray 14 is integrally formed on upper surfaces of a pair of document guides 13a protruding upward from the upper side of the upper cover 12. Through an interlock mechanism 13b (FIGS. 5A, 5B), once one of the document guides 13a is moved manually, the pair of document guides 13a move in the Y direction simultaneously to allow an adjustment of the width therebetween according to the width of the document D in the Y direction. As described above since the length of the discharging tray 14 in the X direction is shorter than that of the feeding tray 13, the portion close to the other side of the feeding tray 13 (the opposite side that is furthest away from the document transporting pathway) serves as a supporting device for supporting the discharged documents D that have been read in a stack. Because an upstream portion of the feeding tray 13 with respect to the document conveying direction serves as the supporting device for supporting the discharged documents D that have been read in a stack, the height of where the documents D are stacked can be reduced. Thus, the multi-function apparatus 1 can become more compact. In order to prevent the front end of the discharged document D from slipping downward from an upstream end portion of the feeding tray 13, a document stopper 34 is provided at the upstream end of the upper cover 12 (the feeding tray 13). A recess 35 that is opened at the top and with which the document stopper 34 is engaged is provided at the upstream end portion of the upper cover 12. The document stopper 34 can be pivoted at its base end in the upstream and downstream directions. The document stopper 34 can be stored in the recess 35. With this structure, the document stopper 34 does not extend beyond the top of the feeding tray 13 (the body case 4) when the multi-function apparatus 1 is not in use or is being packaged. Thus, the multi-function apparatus 1 becomes compact.

The document feeder 3 includes a separating-transporting device, a reverse transporting device and a pathway cover. The separating-transporting device includes a first rotation driving member that separates one sheet of the document from a plurality of documents stacked on the feeding tray 13 and then conveys the document in the first transportation direction (in the direction which the document that is conveyed approaches the reading position Re) and a first contacting member that is capable of resiliently contacting the first rotation driving member. At least one of the first contacting members and the first rotation driving member has an elastic property to provide a cushioning or resilient effect. The reverse transporting device includes a second rotation driving member and a second contacting member. The second rotation driving member reverses the document conveyed from the first path (i.e. the document is conveyed in the first transportation direction) by the separating-transporting device at the reading position Re and further conveys the reversed document to the second path (i.e. the document is conveyed in the second transportation direction). The second contacting member is capable of resiliently contacting the second rotation driving member. At least one of the second contacting member and the second rotation driving member has an elastic property to provide a resilient effect to the other while contacting with each other. The pathway cover is disposed apart from the reverse transporting device and is capable of rotating about a rotational shaft disposed at a position closer to the discharging tray 14 than the feeding tray 13. The pathway cover includes at least the second contacting member of the first and the second contacting members. The pathway cover defines at least a portion of the document transportation pathway. The pathway cover is capable of exposing at least the portion of the document transportation pathway by rotating about the rotational shaft.

Figure 12:
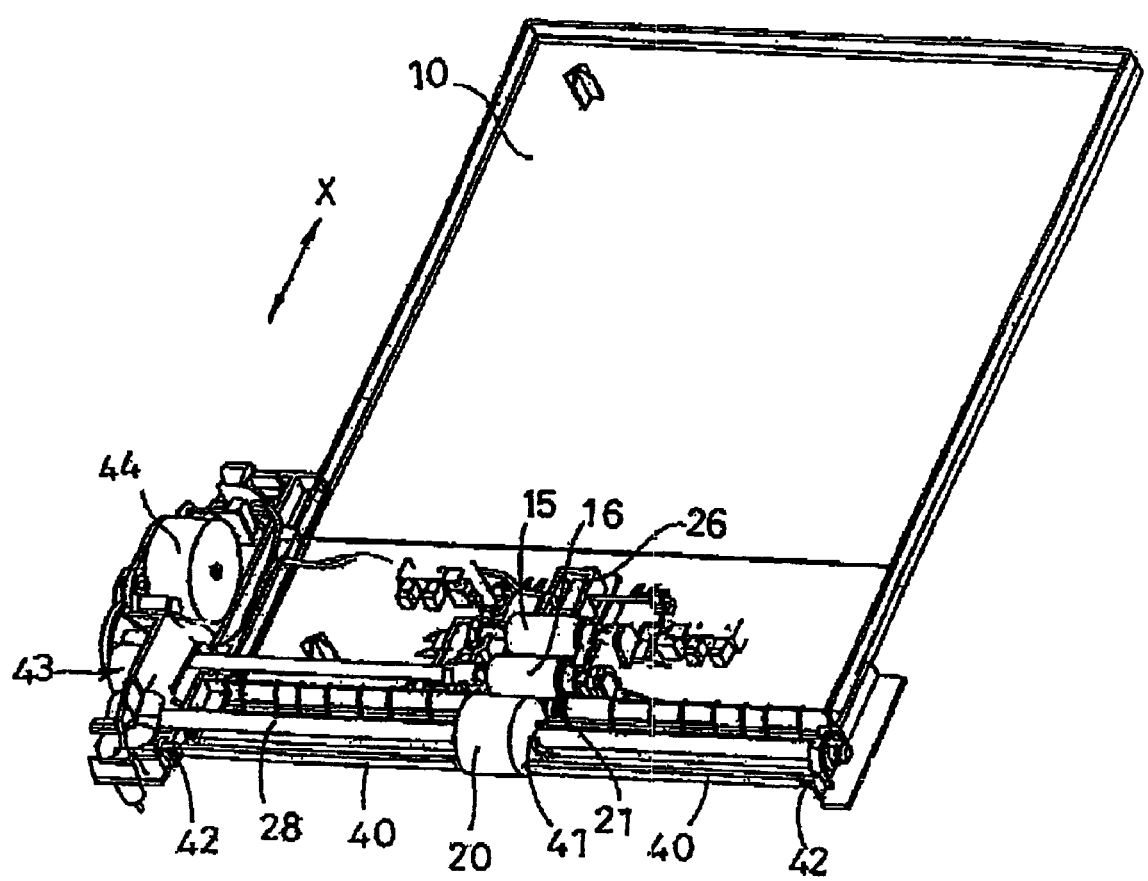
FIG. 12 is a perspective view of a first pressing member and the second pressing member.

In the first embodiment, as shown in FIGS. 5-7 and 9, two rotation driving rollers (a pulling roller 15 and a separating roller 16, which are provided in this order from the upstream side with respect to the document conveying direction) functioning as the first rotation driving member and a reverse roller 20 with a large diameter functioning as the second rotation driving member are arranged substantially at a central portion of a direction perpendicular to the document conveying direction (i.e. in the width direction of the document D), above the pressing plate 10 (referring to FIG. 12). The reading position Re linearly extends in a direction perpendicular to the document conveying direction. A rotation axis of a driving shaft 28 that supports the reverse roller 20 coincides with the reading position Re in the plan view. Thus, the lower surface of the peripheral surface of the reverse roller 20 faces the reading surface of the reading device 8 when the reading device is located at the reading position Re.

Pad members (a pull-nipping plate 17 for the pulling roller 15 and a separating pad 18 for the separating roller 16) functioning as the first contacting member are capable of resiliently contacting the pulling roller 15 and the separating roller 16, respectively. In other words, at least one of the pull-nipping plate and the separating pad 18 and at least one of the pulling roller 15 and the separating roller 16 has an elastic property to provide a resilient effect to the other while contacting with each other. A first pinch roller 21, a second pinch roller 22 and a third pinch roller 23 are freely rotatable following rollers which function as a plurality of second contacting members that resiliently contact the reverse roller 20 such that the second pinch roller 22 is, for example, a third contacting member and the third pinch roller 23 is, for example, a fourth contacting member. The pull-nipping plate 17, the separating pad 18, the second pinch roller 22 and the third pinch roller 23 are disposed on the inner surface of the pathway cover 19. The pathway cover 19 has a substantially L-shape in cross section (referring to FIGS. 3 and 9). A cover-like upper guide member 52 to be subsequently described is not illustrated in FIGS. 5A, 5B-7, and 9.

The second pinch roller 22 and the third pinch roller 23 are supported by ends of a metal spring plate 27 having a substantially L-shaped cross section, via shafts of the second and third pinch rollers 22, 23. An intermediate portion of the spring plate 27 is fixed to the inner surface of the pathway cover 19. A first pinch roller 21 is a following roller that is disposed at a position downstream from the separating roller 16 with respect to the document conveying direction. The first pinch roller 21 is capable of contacting the reverse roller 20. The first pinch roller 21 is attached to a frame 24 made of, for example, metal. The frame 24 is disposed in a manner capable of moving in the X direction above the pressing plate 10. A compression coil spring 25 functioning as an urging device is provided to elastically press an upstream end of the frame 24 toward the reverse roller 20. An upstream end of the compression coil spring 25 is supported by a supporting plate 26 (referring to FIGS. 6 and 7)

In this embodiment, it is arranged such that the first contacting member (the pull-nipping plate 17 and the separating pad 18) is capable of resiliently contacting the two rotation driving rollers (the pulling roller 15 and the separating roller 16 arranged downstream from the pulling roller 15 in the document conveying direction), as the first rotation driving member. Alternatively, it may be arranged such that the two rotation driving rollers (the pulling roller 15 and the separating roller 16 arranged downstream from the pulling roller 15 in the document conveying direction), as the first rotation driving member, are capable of resiliently contacting the first contacting member (the pull-nipping plate 17 and the separating pad 18).

A discharge assistant guiding plate 29 functioning as a discharging chute is provided to the pathway cover 19 and is disposed at a position downstream from the third pinch roller 23 with respect to the document conveying direction. An upstream end 29a of the discharge assistant guiding plate 29 is tilted so as to be positioned at a level that is lower than the top surface of the reverse roller 20. A space between the upstream end 29a of the discharge assistant guiding plate 29 and a downstream end 19b of an upper roof 19a of the pathway cover 19 serves as a discharging outlet of the document D. The discharge assistant guiding plate 29 has a horizontal portion 29b on the downstream side with respect to the document conveying direction. The horizontal portion 29b of the discharge assistant guiding plate 29 is disposed at a position which is the substantially same level as a position where a horizontal portion of the discharging tray 14 is provided, such that an upper surface of the horizontal portion 29b continues toward an upper surface of an upstream horizontal portion of the discharging tray 14. The pull-nipping plate 17 and the separating pad 18 are capable of rotating about their base ends (their upper ends), respectively, under the discharge assistant guiding plate 29, in the pathway cover 19. The pull-nipping plate 17 is pressed against the pulling roller 15 by a compression coil spring 30 functioning as a pressing member. The separating pad 18 is pressed against the upper surface of the separating roller 16 by a plate spring 31 functioning as a pressing member. Because the documents D stacked on the feeding tray 13 are pulled between the pull-nipping plate 17 and the pulling roller 15, a portion under the discharge assistant guiding plate 29 functions as a pull-in chute 32 into which the documents D are pulled from the feeding tray 13.

Figure 6:
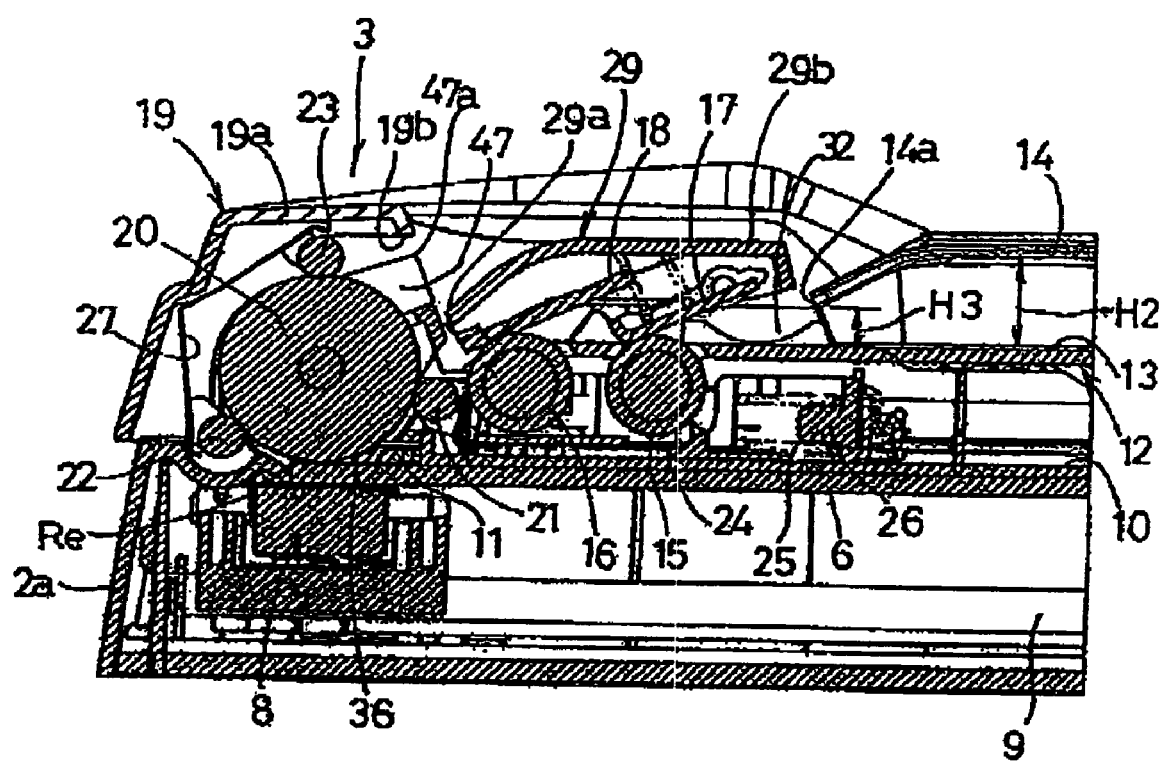
FIG. 6 is an enlarged cross-sectional view of the left side of FIG. 5A.
Figure 9:
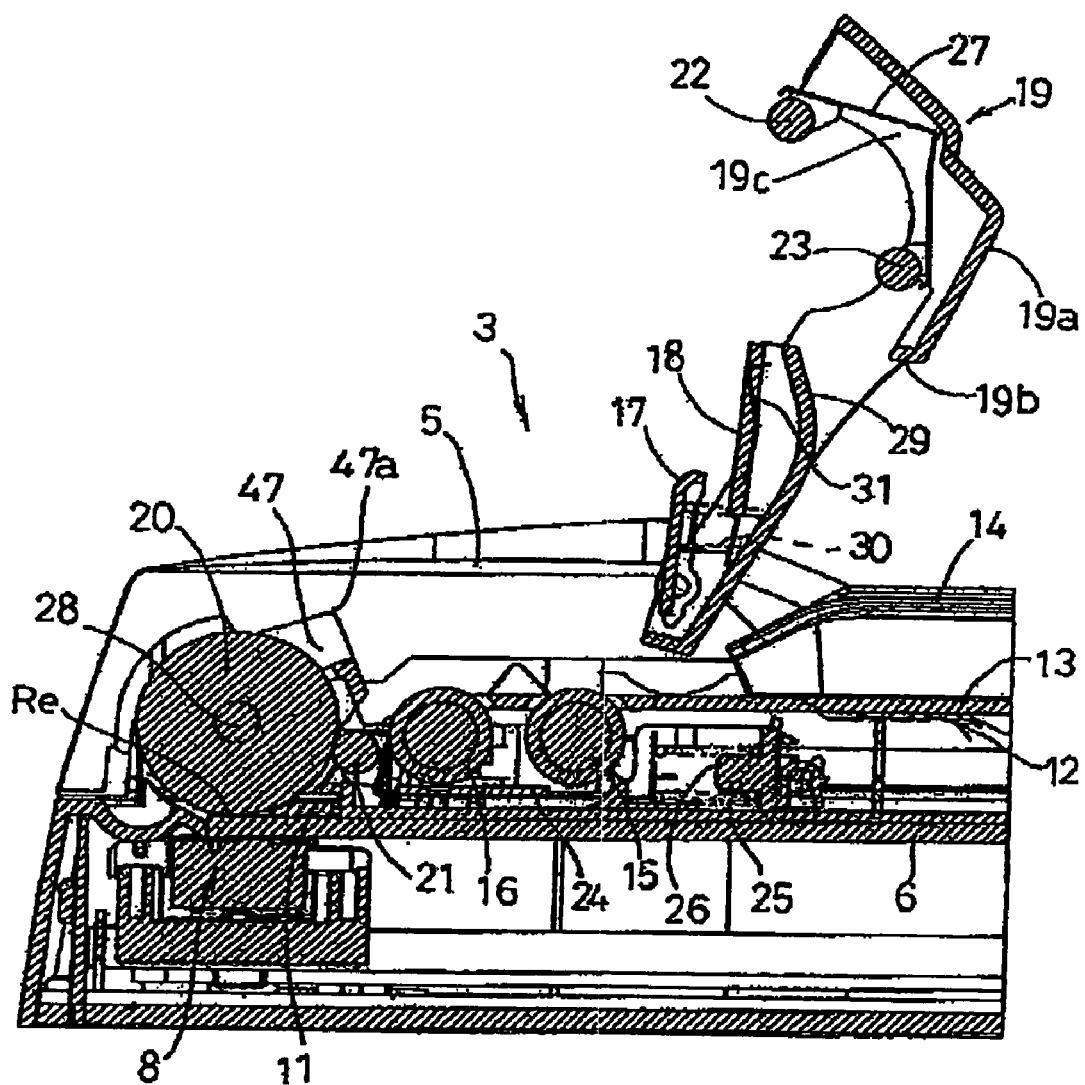
FIG. 9 is a cross-sectional view along line IX-IX of FIG. 8.
Figure 10:
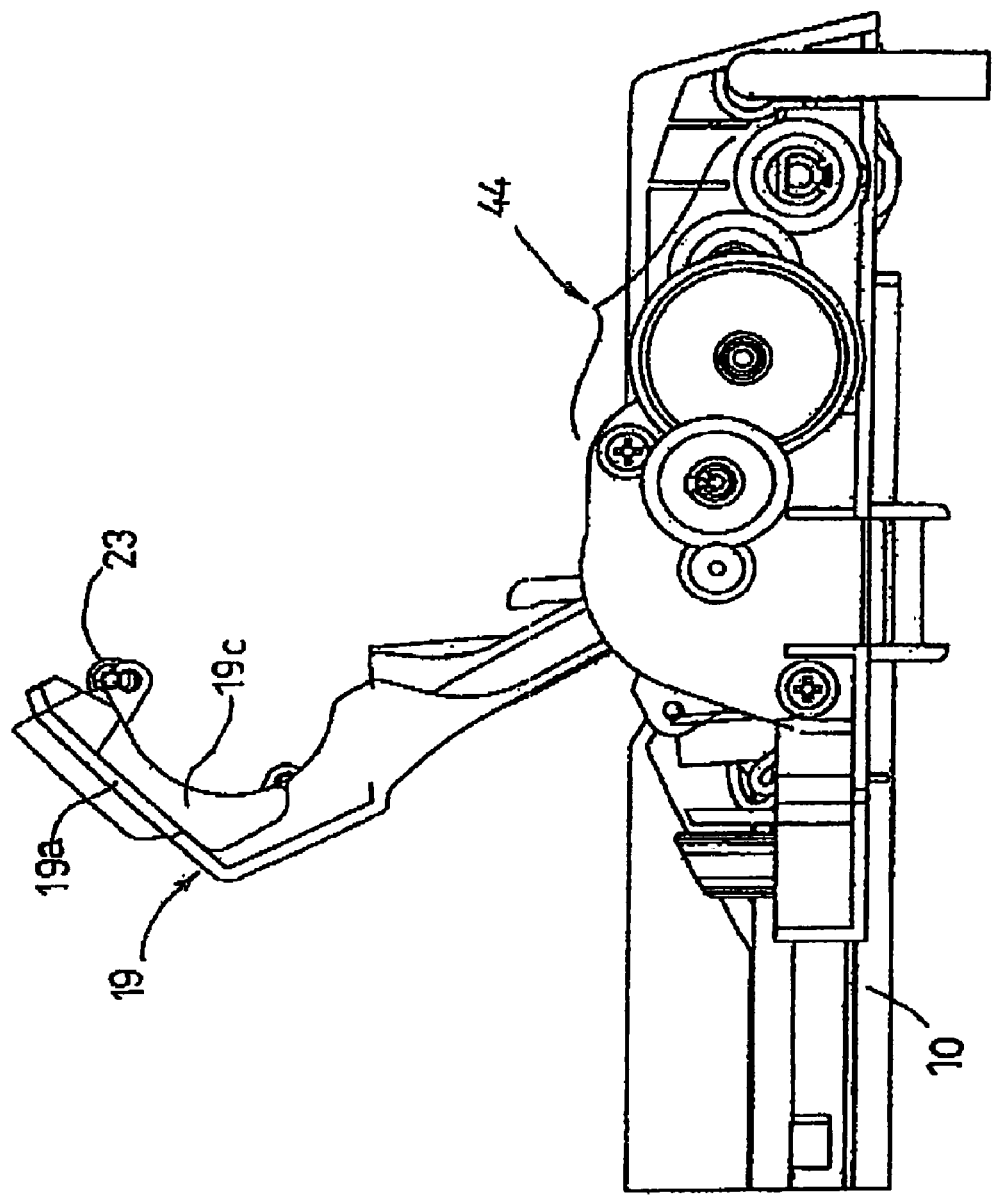
FIG. 10 is a side view of a power transmission part.
Figure 11:
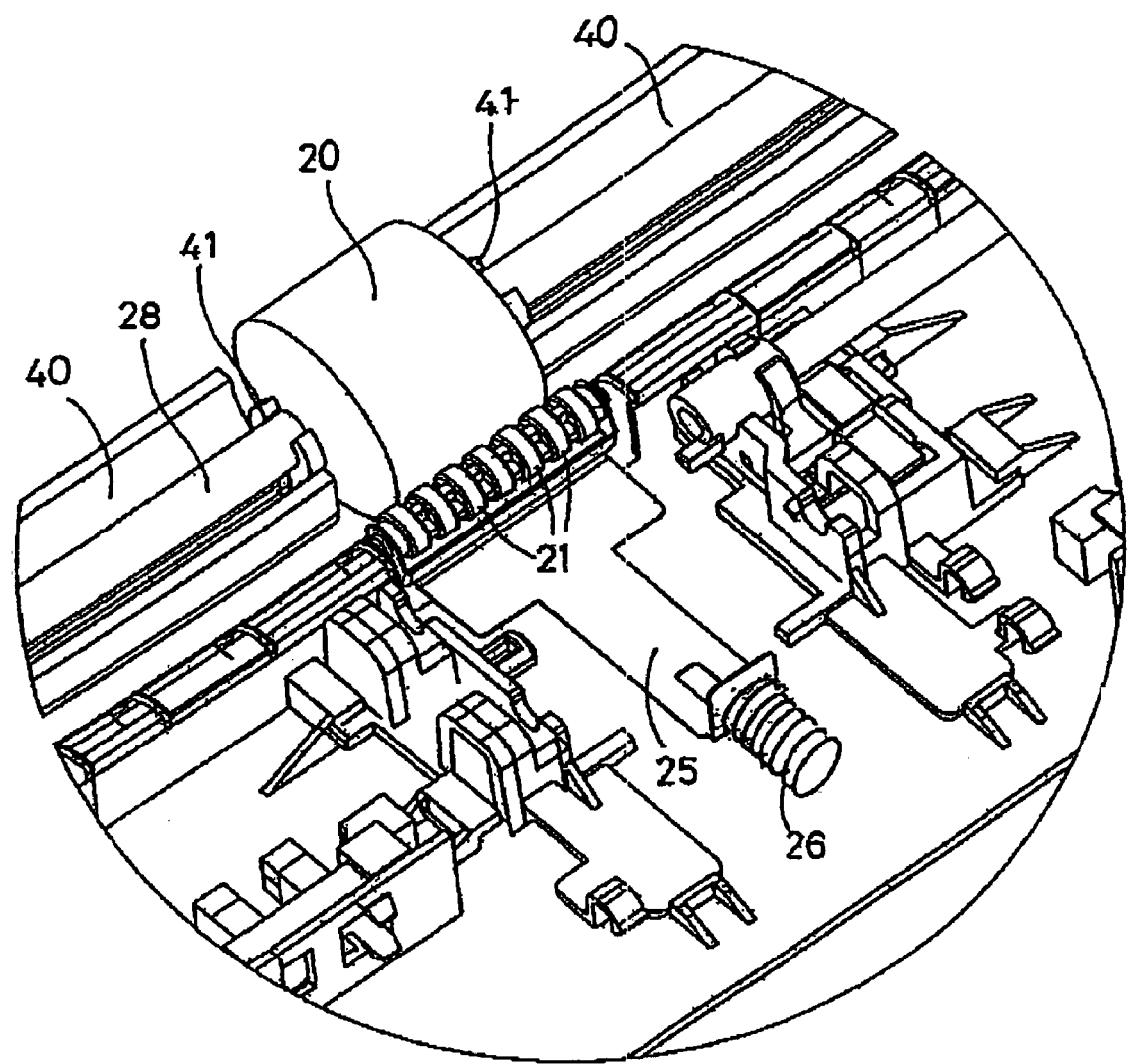
FIG. 11 is a perspective view of a pressing member of the first pinch roller.

The pathway cover 19 is capable of rotating upward and downward about a rotational shaft (not shown), which inwardly protrudes from both sides under the discharge assistant guiding plate 29 and near the base end of the pull-nipping plate 17 (i.e. at the position close to the separating-transporting device and far from the reverse roller 20). As shown in FIGS. 6 and 9, when the pathway cover 19 is closed, the pull-nipping plate 17, the separating pad 18 and the second and the third pinch rollers 22, 23 are resiliently pressed against the upper surfaces of the pulling roller 15, the upper surface of the separating roller 16 and the peripheral surface of the reverse side of the reverse roller 20, respectively. When the pathway cover 19 is rotated upward to be opened, the second pinch roller 22 and the third pinch roller 23 are separated from the reverse roller 20. If the pathway cover 19 is widely rotated substantially 120 degrees (referring to FIG. 9), the pull-nipping plate 17 and the separating pad 18 can separate from the pulling roller 15 and the separating roller, 16 respectively. Thus, if paper jam occurs, the document D sandwiched at the contacting portions (nipping portions) of these members can be easily removed. The paper jam problem can be solved. The document D sandwiched at the contacting portion (nipping portion) of the first pinch roller 21, which can move against the urging force of the coil spring 25, and the reverse roller 20 can be pulled out therefrom regardless of the extent of the urging force of the coil spring 25.

Figure 7:
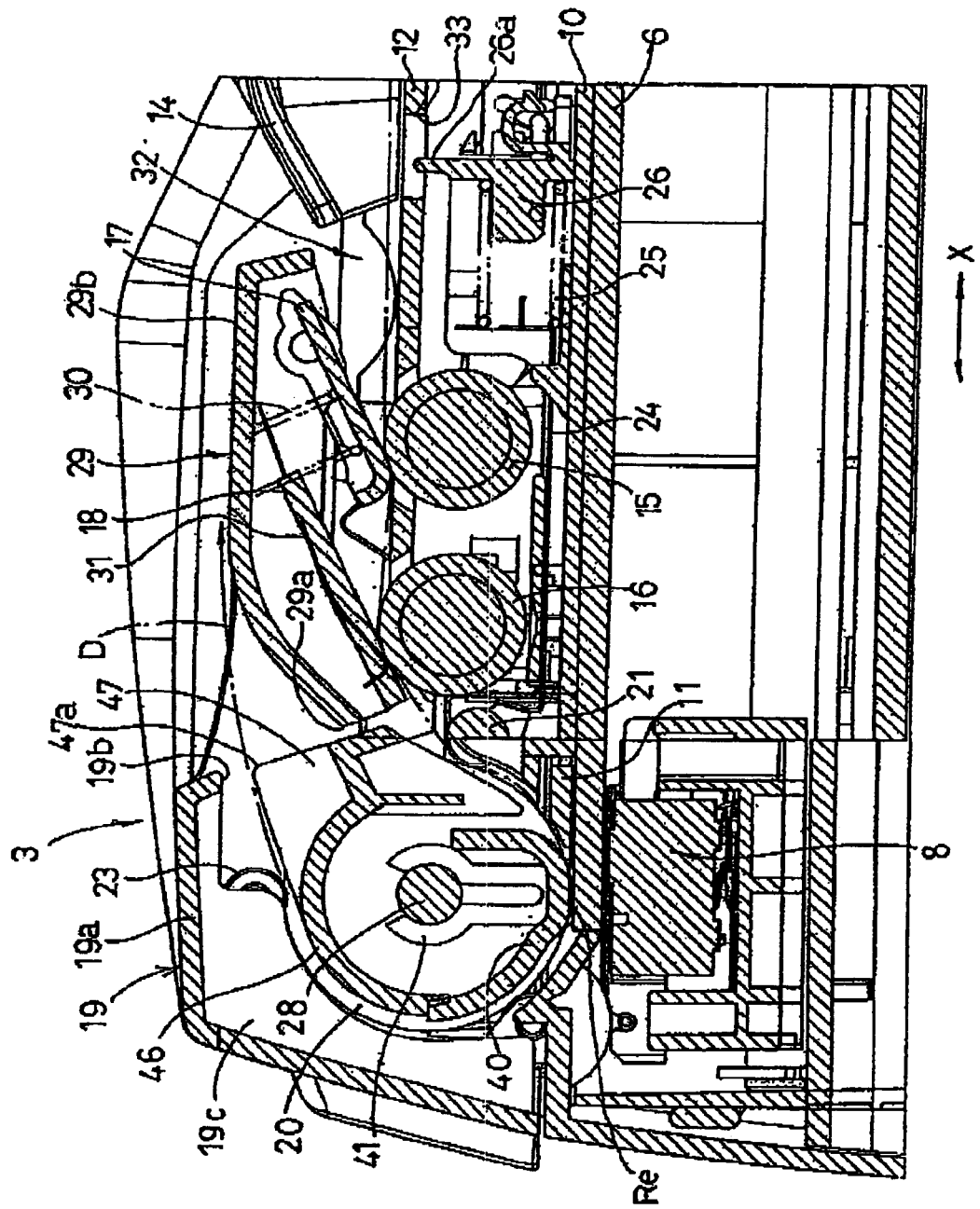
FIG. 7 is an enlarged cross-sectional view of FIG. 6.
Figure 8:
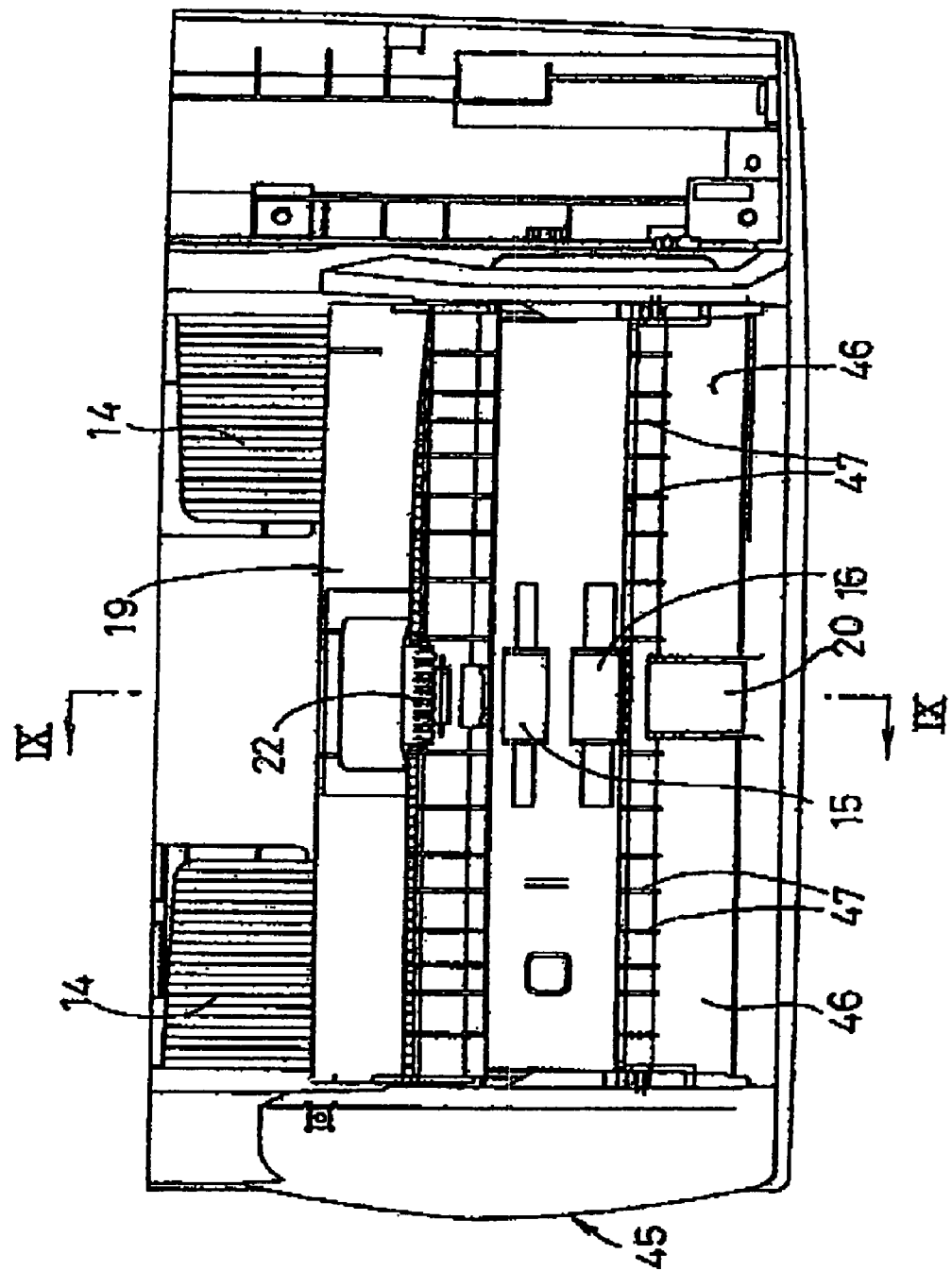
FIG. 8 is a plan view of the document feeder when the pathway cover is opened.

As shown in FIG. 7, the supporting plate 26 supporting the upstream end of the coil spring 25 is capable of moving in the X direction. In addition, a separating device is adopted. In the separating device, a handle 26a protruding from the supporting plate 26 is placed in a slit 33 provided in the upper cover 12. The operator can move the handle 26a and the supporting plate 26 with a finger or a tool, such as a screwdriver, to separate the first pinch roller 21 from the peripheral surface of the reverse roller 20 against the urging force of the coil spring 25. By doing so, the document D can be pulled therefrom with little force and the paper jam can be easily solved.

The document D to be read is placed between the lower surface of the plate-shaped discharging tray 14 and the feeding tray 13 with its image recording surface facing down. A distance between the lower surface of the horizontal portion of the discharging tray 14 and the upper surface of the feeding tray 13 is referred to as a height H2 (FIG. 6). An upstream end 14a of the discharging tray 14 disposed near the pulling roller 15 is tilted so as to be located at a position that is lower than the lower surface of the horizontal portion of the discharging tray 14. A distance between a tip of the upstream end 14a and the upper surface of the feeding tray 13 is referred to as a height H3 (FIG. 6). Therefore, a feeding inlet, defined by the upstream end 14a and the upper surface of the feeding tray 13, has the height H3. By setting H3<H2 (referring to FIG. 6), the document D stacked on the feeding tray 13 smoothly guided between the pulling roller 15 and the pull-nipping plate 17. By employing the pulling device, for example, the pulling roller 15 and the pull-nipping plate 17, the document D stacked on the horizontal feeding tray 13 can be surely sent to the separating-transporting device, such as the separating roller 16 and the separating pad 18. In order to ensure this effect, the pulling roller 15 and the separating roller 16 have a substantially same diameter and a substantially same peripheral speed.

As shown in FIGS. 3, 7, 11 and 12, a first pressing member 40 is provided on each side of the reverse roller 20 (in the width direction of the document D) to press the image recording surface of the document D onto the surface of the glass plate 6 without any gap between the document D and the glass plate 6 at the opening 36 including the reading position Re. The first pressing members 40 are integrally formed (by injection molding of synthetic resin) with the large pressing plate 10 (i.e. the second pressing member). As shown in FIG. 12, base ends of the first pressing member 40 (the portions adjacent to side edges of the document D in its width direction) are integrally connected with portions adjacent to shaft supporting portions 42 for the driving shaft of the reverse roller 20 disposed at the side of the pressing plate 10. A transmission case 45, which houses therein a transmission gear mechanism 43 and a driving motor 44 for transferring the rotation driving force to the driving shaft 28, the pulling roller 15 and the separating roller 16, respectively, is externally disposed beside one of the shaft supporting portions 42 (referring to FIGS. 1-4, 10 and 12).

Each of the first pressing members 40 has a substantially semicircular-shaped body having a downwardly protruding portion, when viewed from the front. An elastic hook 41 is integrally formed with a portion, which is provided adjacent to the sides of the reverse roller 20, of each of the first pressing members 40. Each of the elastic hooks 41 is fitted to the driving shaft 28 of the reverse roller 20 such that the first pressing members 40 are suspended from the driving shaft 28. Accordingly, the position of the lower surfaces of the first pressing members 40 with respect to the glass plate 6 can be easily maintained with the simple structure.

The lower surface of each of the first pressing members 40 at a region corresponding to the opening 36 extends substantially in parallel with the surface of the glass plate 6, and is positioned closer to the surface of the glass plate 6 than the outer surface (the lower surface) of the reverse roller 20. Accordingly, the document D that is being carried along the outer surface of the reverse roller 20 is temporarily separated from the lower surface of the reverse roller 20 such that the document D can be pressed onto the surface of the glass plate 6 without any gap therebetween, with the image recording surface facing downward. Thus, an image can be can be precisely read from the document D by the reading device 8. The first pressing members 40 are disposed beside the sides of the reverse roller 20 in the width direction of the document D perpendicular to the document conveying direction and the portions of the pressing members 40 that face the glass plate 6 have the substantially flat surface. Accordingly, a substantially uniformly flat surface can be provided across the entire image recording region in the width direction of the document D, without increasing the size of the reverse roller 20 in the width direction of the document D, by using the first pressing members 40 disposed on sides of the reverse roller 20. Thus, the image in the width direction of the document D can be precisely read.

Moreover, a white tape or paint is adhered or applied to the lower surface of each of the first pressing members 40 in the region including the reading position Re. In this way, the chromaticity or saturation as a reference in the reading device 8 can be detected.

A mechanism that enables the automatic document feeder 3 to stack discharged documents D in a normal order will be described. With the above mechanism, a subsequently discharged document D is surely placed under a previously discharged document D while their image recording surfaces face up, above the reverse roller 20, when the document D are discharged onto the discharge assistant guiding plate 29, and by extension, onto the discharging tray 14 after the documents D are read and reversed and further conveyed in the second transportation direction.

Figure 13:
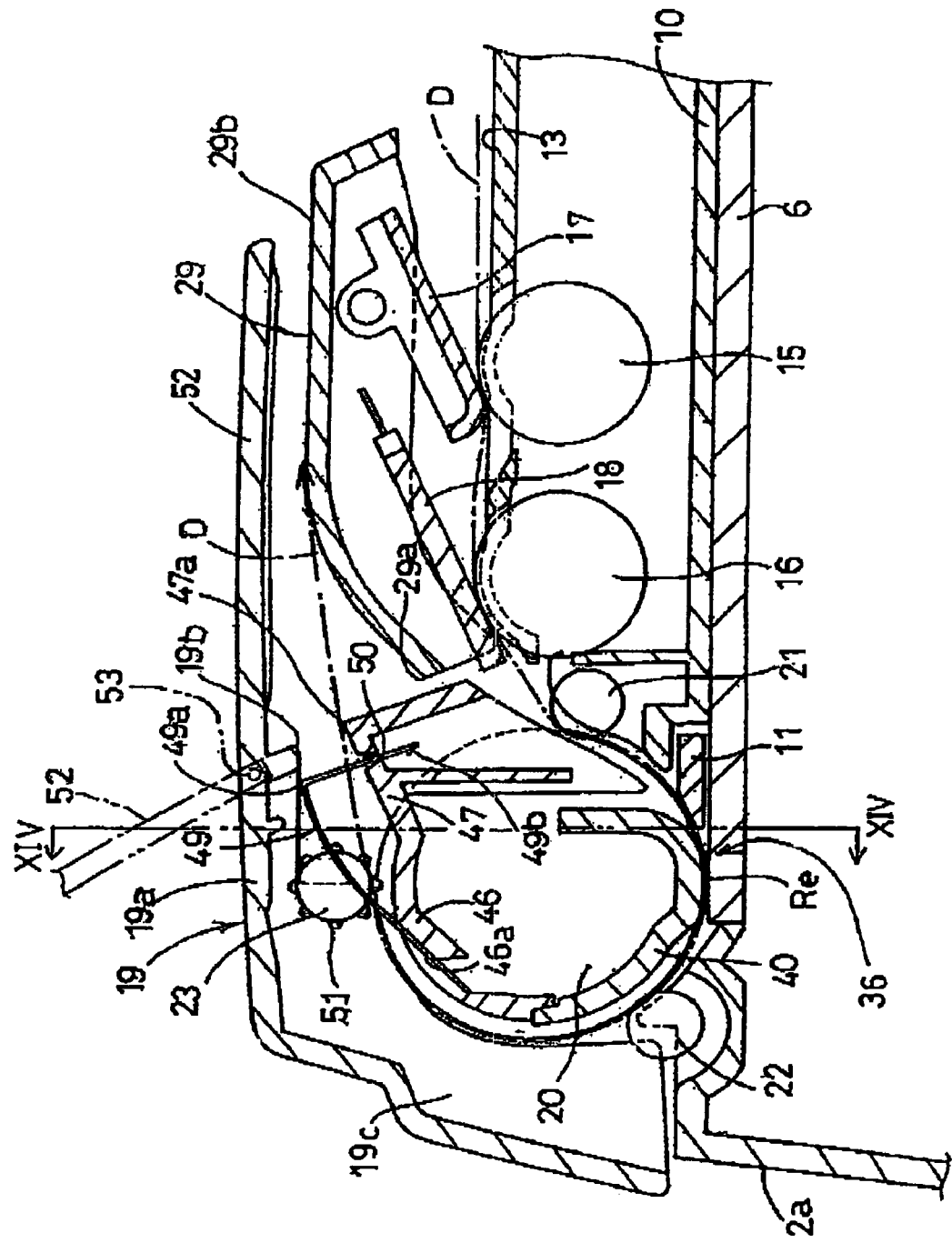
FIG. 13 is an enlarged cross-sectional view of second to fifth embodiments according to the present invention.
Figure 14:
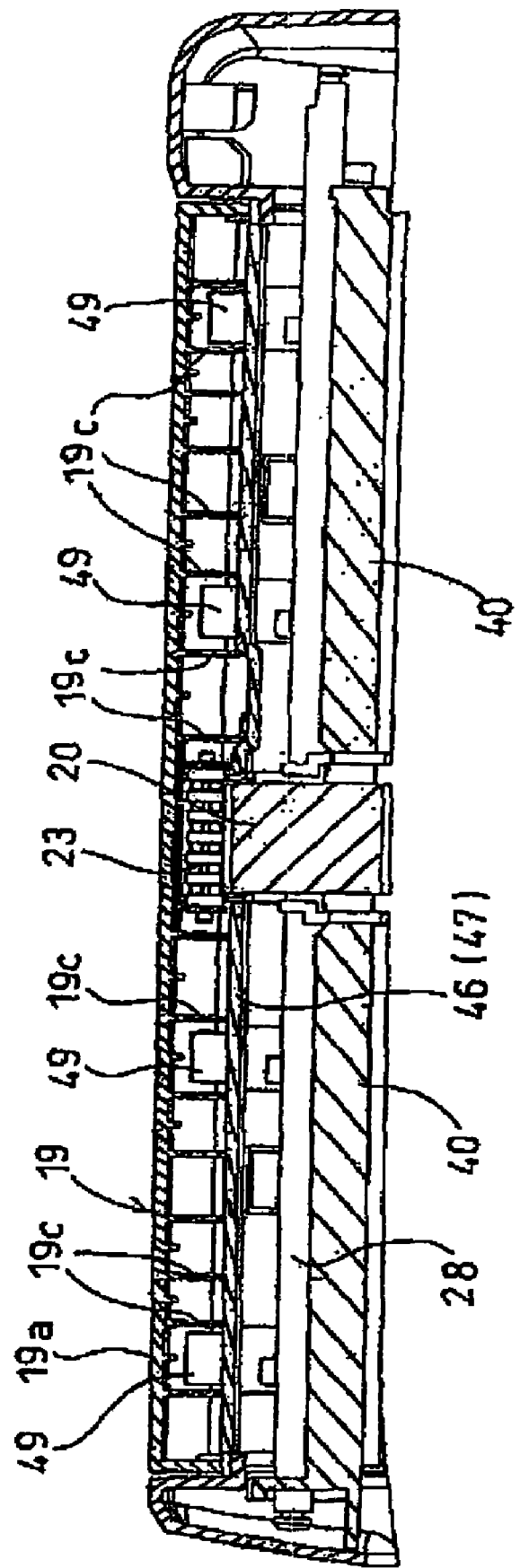
FIG. 14 is a cross-sectional view along line XIV-XIV of FIG. 13.

In the first embodiment, when the pathway cover 19 is closed, the nipping portion (the contact portion) of the most downstream third pinch roller 23 and the upper portion of the peripheral surface of the reverse roller 20 is provided at a position that is higher than the upstream end 29a of the discharge assistant guiding plate 29 and that is lower than the upper surface of horizontal portion 29b of the discharge assistant guiding plate 29 (i.e. the downstream side), with respect to the document conveying direction (referring to FIGS. 6, 7 and 13).

With this structure, the documents D stacked on the discharging tray 13 with their image recording surfaces facing down, is separated, one by one, in order, and carried by the separating roller 16 and the separating pad 18, starting with the lowermost document D. The separated document D is carried to the opening 36 via the contact portion of the first pinch roller 21 and the lower peripheral surface of the reverse roller 20. At the opening 36, the document D is carried while being pressed by the first pressing members 40 so that the image recording surface of the document D is in contact with the surface of the glass plate 6. The image of the document D is read at the reading position Re in the opening 36 by the reading device 8 located under the opening 36. The document D is then conveyed through the contact portions of the second and third pitch rollers 22, 23 and the peripheral surfaces of the reverse roller 20 and is discharged from the discharging outlet that is provided under a downstream end 19b of the upper roof 19a of the pathway cover 19 with respect to the document conveying direction. The discharged document D is placed on the upper surfaces of the discharge assistant guiding plate 29 and the discharging tray 14, with its image recording surface facing up. In such a case, the position where the third pinch roller 23 and the reverse roller 20 are contacted with each other at a position is higher than the upstream end 29a of the discharge assistant guiding plate 29 and is lower than the upper surface of the horizontal portion 29b of the discharge assistant guiding plate 29 (i.e. the downstream portion) with respect to the document conveying direction. Thus, the front end of the subsequently discharged document D approaches the lower surface i.e. the surface opposite to the image recording surface of the previously discharged document D that is placed on the discharge assistant guiding plate 29, and the subsequently discharged document D is guided onto the discharge assistant guiding plate 29. Therefore, the stacking order of the discharged documents is the same as that of the documents D that were placed on the feeding tray 13 before being read. Consequently, the operator does not have to change the stacking order of the discharged documents D.

A second embodiment for ensuring the above effect is shown in FIGS. 3, 4, 6, 7 and 13. A pair of engaging members 46 having a substantially semicylindrical shape in cross-section is disposed on the sides of the reverse roller 20 while sandwiching the reverse roller 20 therebetween, so as to extend in the width direction of the document D. Each of the engaging members 46 is disposed above each of the respective first pressing members 40 and continues to the upper part of each of the respective first pressing members 40. The pair of engaging members 46 covers the driving shaft 28 from the upper side. Each of the respective engaging members 46 is connected with each of the respective first pressing members 40 by an engaging device (not shown). A plurality of rib-shaped guiding members 47 is integrally formed on outer surfaces of the engaging members 46, at predetermined intervals, in the extension direction of the driving shaft 28. The guiding members 47 extend diagonally upward from the outer surfaces of the engaging members 46 at positions that is the same level when the third pinch roller 23 and the reverse roller 20 contact with each other. The guiding members 47 extends to the vicinity of the upstream end 29a of the discharge assistant guiding plate 29. A top end 47a of each of the guiding members 47 is located at a position that is higher than the position where the third pinch roller 23 and the reverse roller 20 are contacted with each other. With this structure, the document D that is released from the contact portion of the third pinch roller 23 and the reverse roller 20 is guided to the position above the top ends 47a along the guiding members 47. Since the top ends 47a of the guiding members 47 are provided at the positions lower than the horizontal portion 29b of the discharge assistant guiding plate 29, the front end of the subsequently discharged document D approaches the lower surface (i.e. the surface opposite to the image recording surface) of the previously discharged document D placed on the discharge assistant guiding plate 29, and the subsequently discharged document can be guided onto the discharge assistant guiding plate 29. Thus, the stacking order of the discharged documents D can become the same as that of the documents D that were placed on the feeding tray 13 before being read.

A third embodiment for maintaining the stacking order of the discharged documents D in the normal order is shown in FIG. 13. The automatic document feeder 3 of the third embodiment includes elastic supporting members 49 for lifting the document D from the contact portion of the third pinch roller 23, which is located at the most downstream position in the document conveying direction, and the reverse roller 20. Each elastic supporting member 49 includes an elastic plate made of synthetic resin, such as PET (polyethylene terephthalate) with a thickness of 0.2 mm to 1 mm, and the cross section thereof is substantially L-shape. A base end of each of the elastic supporting plates 49 is fixed by adhesive in each of respective recesses 46a that are disposed at appropriate positions on the outer surfaces of the engaging members 46 in the width direction of the document D, near the contact portion of the third pinch roller 23 and the reverse roller 20. Each of the elastic supporting members 49 is arranged such that the elastic supporting plate 49 is lifted toward the downstream in the document conveying direction (i.e. an top end 49a of each of the elastic supporting member 49 is located at a position higher than the horizontal portion 29b of the discharge assistant plate 29). A free end 49b of each of the elastic supporting members 49 bends and extends downward from the top end 49a, and is inserted into each of respective slits 50 provided in the engaging members 46. In this way, when the document D that is released from the contact portion of the third pinch roller 23 and the reverse roller 20 is placed onto the elastic supporting members 49, the elastic supporting members 49 are warped downward due to the weight of the document D. In this condition, while the free end (the front end) of the document D that is upwardly supported by the elastic force of the elastic supporting members 49 is maintained in a substantially horizontal position, the document D can then be discharged onto the discharge assistant guiding plate 29. The front end of the subsequently discharged document D approaches the lower surface (i.e. the surface opposite to the image recording surface) of the previously discharged document D that is placed on the horizontal portion 29*b* of the discharge assistant guiding plate 29, and the subsequently discharged document D can be guided and conveyed onto the discharge assistant guiding plate 29. Thus, the stacking order of the discharged documents D can be the same as that of the documents D that were placed on the feeding tray 13 before being read.

Each of the elastic supporting members 49 has a substantially L shape in cross section. The base ends of the elastic supporting members 49 are fixed on the respective outer surface of the engaging members 46 disposed on the both sides of the reverse roller 20. The free ends 49*b* of the elastic supporting members 49 that extend diagonally downward are inserted into the respective slits 50 provided in the engaging members 46. When the document D is conveyed onto the elastic supporting members 49 and the elastic supporting members 49 are warped downward due to its elasticity, the free ends 49*b* thereof move up and down while being guided along the respective slits 50. Thus, the warping direction of the elastic supporting members 49 is limited, so that the front end of the subsequently discharged document D is further ensured to approach the lower surface (i.e. the surface opposite to the image recording surface) of the previously discharged document D.

A plurality of ribs 19*c* that extend in the X direction to the downstream end 19*b* with respect to the document conveying direction are integrally formed on the inner surface of the pathway cover 19 (referring to FIGS. 3, 4, 7, 9, 10, 13 and 14). The ribs 19*c* are in the Y direction at predetermined intervals. The elastic supporting members 49 are arranged between the plurality of the ribs (referring to FIG. 14). By doing so, the range of moving up and down of the top end 49*a* can be widen. Thus, the lifting of the discharged document D by the elastic supporting members 49 can be further maintained.

A fourth embodiment for maintaining the stacking order of the discharged documents D in the normal order is shown in FIG. 13. A plurality of sweeping rollers 51 is disposed at a substantially same height as the third pinch roller 23 located at the most downstream position in the document conveying direction. The sweeping rollers 51 can be a cylindrical roller with protrusions individually arranged on the periphery thereof at predetermined intervals, can be a roller having a spur-like cross section, or can be a spur made of a thin plate. The plurality of sweeping rollers 51 is arranged facing the outer surfaces of the engaging members 46 or the reverse roller 20. When the sweeping rollers 51 are disposed facing the outer surfaces of the engaging members 46, the sweeping rollers 51 are preferably willingly rotated. According to the structure of this embodiment, because of the rotation of the sweeping rollers 51, the front end of the document D that is released from the contact portion of the third pinch roller 23 and the reverse roller 20 is willingly lifted. If the front end of the document D curls downward, the front end of the document D is prevented from being interfered with the tilted upstream end 29*a* of the discharge assistant guiding plate 29. Therefore, the document D can be smoothly guided toward the horizontal portion 29*b* of the discharge assistant guiding plate 29. Thus, the stacking order of the discharged documents D is the same as that of the documents D that were placed on the feeding tray 13 before being read.

A fifth embodiment for maintaining the stacking order of the discharged documents D in the normal order will be described. The automatic document feeder 3 includes a substantially horizontal cover-like upper guiding member 52, which is provided so as to cover at least a portion of the upper side of the discharge assistant guiding plate 29. The cover-like upper guiding member 52 preferably extends from the tilted upstream end 29*a* to the upstream half of the horizontal portion 29*b* of the discharge assistant guiding plate 29 as shown in FIGS. 1 and 13. With this structure, the upstream part of the previously discharged document D placed on the discharge assistant guiding plate 29 in the document conveying direction is regulated by a lower surface of the cover-like upper guide member 52, so that the upstream part of the document D can be maintained to be substantially parallel to the horizontal portion 29*b* of the discharge assistant guiding plate 29. Thus, the front end of the subsequently discharged document is smoothly guided toward the lower surface (i.e. the surface opposite to the image recording surface) of the previously discharged document D. Consequently, a plurality of discharged documents can be stacked on the discharging tray 14 in the order that is the same as that of the documents D that were placed on the feeding tray 13 before being read.

A base end of the cover-like upper guiding member 52 is attached, via a hinge 53, at a position near the downstream end 19*b* of the upper roof 19*a* of the pathway cover 19 and is pivotable upward and downward about the hinge 53. Accordingly, when the pathway cover 19 is widely opened, a free end of the cover-like upper guide member 52 contacts the upper surface of the discharging tray 14 or the feeding tray 13. Thus, the opening state of the pathway cover 19 can be maintained.

Moreover, the present invention may preferably be adopted by appropriately incorporating the features and structures described in the second to fifth embodiments into the features and structures of the first embodiment.

Furthermore, the outer surfaces of the engaging members 46 have a substantially semicircular shape. Thus, the curled end portions (the sides in the width direction of the document D) which are not slide-contacted with the reverse roller 20 can be guided to the discharging outlet smoothly along the outer surfaces of the engaging members 46 without being caught by the driving shaft 28.

The reverse roller 20 functioning as the second rotation driving member can be replaced by using an endless belt.

An exemplary embodiment provides a document feeder, disposed on an image reader having a reading device that reads an image of a document being conveyed in a predetermined document conveying direction to the reading position, the document feeder comprising: a substantially U-shaped document transporting pathway, comprising a first transportation direction and a second transportation direction for conveying the document from a feeding tray located at a lower side of the document feeder to a discharging tray located higher than the feeding tray through the reading position; a separating-transporting device, including a first rotation driving member and a first contacting member, wherein the first rotation driving member separates one sheet of the document stacking on the feeding tray and conveys the document in the first transportation direction, and the first rotation driving member and the first contacting member are in a resilient contact with each other, wherein either or both of the first rotation driving member and the first contacting member comprise an elastic property to provide a resilient effect when being contacted; a reverse transporting device, including a second rotation driving member and a second contacting member that is in a resilient contact with the second rotation driving member, wherein the reverse transporting device reverses and further conveys the one sheet of the document conveyed by the separating-transporting device into the second transportation direction; and a pathway cover, capable of parting from the reverse transporting device and capable of rotating with respect to a rotational shaft that is disposed closer to the discharging tray than the feeding tray, wherein at least the second contacting member of the first and second contacting members is disposed on the pathway cover for opening at least a part of the document transporting pathway. When the pathway cover is closed, the first and the second contacting members are in a resilient contact with the first and the second rotation driving members, respectively. When the pathway cover is opened, at least one of the second contacting member parts from the second rotation driving member.

According to an exemplary embodiment, the second rotation driving member comprises a reverse roller. A portion of a peripheral of the reverse roller is arranged in a manner oppose to a reading surface of the reading device. The second contacting member comprises a plurality of following rollers that are in a resilient contact with the reverse roller. In the case when the cover is opened, at least a part of the plurality of following rollers parts from a peripheral of the reverse roller.

According to an exemplary embodiment, the first rotation driving member comprises two driving rollers that are arranged apart in a document conveying direction. The first contacting member is formed in a pad-like structure for biasing the two driving rollers respectively, wherein the first contacting member comprises an elastic property capable for providing a resilient effect.

According to an exemplary embodiment, each of the pad-like first contacting member is configured to press each of the driving rollers via a pressing device located on an inner surface of the pathway cover.

According to an exemplary embodiment, the second contacting members in contact with the second rotation driving members are the following rollers. The following rollers are respectively located at positions that are upstream and downstream from the reading position with respect to the document conveying direction. In the case when the pathway cover is opened, the following roller located at the downstream side in the document conveying direction parts from the reverse roller.

According to an exemplary embodiment, the following roller located at a position upstream from the reading position with respect to the document conveying direction is installed on a moveable frame disposed on a body side of the document feeder. The frame is biased by a spring to make the following roller pressed by the reverse roller.

According to an exemplary embodiment, the document feeder further comprises a separating device for compelling the following roller located at a position upstream from the reading position with respect to the document conveying direction to part from the reverse roller.

According to an exemplary embodiment, the pathway cover comprises: a pull-in chute, for drawing the document from the feeding tray; and a discharging chute, disposed at a position higher than that of the pull-in chute, for guiding the document that has been reversed from the first transportation direction to the second transportation direction the second rotation driving member and further conveyed by the second rotation driving member to the discharging chute.

According to an exemplary embodiment, the document feeder further comprises at least two second contacting members, arranged at a position downstream from the reading position with respect to the document conveying direction. At least one of the second contacting members, which are located at the most downstream position in the document conveying direction, contact the reverse roller at a position lower than the highest position of the discharging chute when the pathway cover is closed.

According to an exemplary embodiment, in addition, the document feeder further comprises a guiding member, located between the second contacting members disposed at the most downstream position in the document conveying direction and the discharging chute. The guiding member is for guiding the document upward from a contact location of at least one of the second contacting members at the most downstream position in the document conveying direction and the second rotation driving member.

According to exemplary embodiment, the document feeder further comprises an elastic supporting plate, for lifting the document from a contact location of at least one of the second contacting member located at the most downstream position in the document conveying direction and the second rotation driving member.

According to an exemplary embodiment, the elastic supporting plate has a substantially L-shaped cross-section. A base end of the elastic supporting plate is fixed on an engaging member disposed at the left and the right sides of the second rotation driving roller. A free end of the elastic supporting plate that extends and tilts downward is inserted into a slit formed in the engaging member.

According to an exemplary embodiment, the document feeder further comprises a plurality of ribs formed on the inner surface of the pathway cover in a direction perpendicular to the document conveying direction, wherein the ribs are spaced apart. The elastic supporting plate is arranged between the ribs.

According to an exemplary embodiment, the document feeder further comprises a sweeping roller, for sweeping the document upward from a contact location of at least one of the second rotation driving member at the most downstream position in the document conveying direction and the second rotation driving member.

According to an exemplary embodiment, the document feeder further comprises a cover-like upper guide member, disposed above at least a portion of the discharging chute.

According to an exemplary embodiment, the document feeder further comprises an exposure opening, located under the second rotation member for exposing a part of a down-facing image recording surface of the document conveyed towards the first transporting direction; a first transparent member, for allowing the part of the document exposed by the exposure opening to slide; and a first reading device, disposed under the first transparent member, for reading the image recording surface of the document.

According to an exemplary embodiment, the document feeder further comprises a first pressing member, for making the document to temporarily part from the peripheral of the second rotation driving member for a portion of the document exposed by the exposure opening to become flat.

According to an exemplary embodiment, the first pressing member is disposed in the width direction of the document perpendicular to the document conveying direction beside both sides of the second rotation driving member. A portion of the pressing member facing the first transparent is substantially flat.

According to an exemplary embodiment, at least a part of the first pressing member is suspended by a supporting shaft of the second rotation driving member.

According to an exemplary embodiment, the document feeder further comprises a second transparent member, where the document with a down-facing recording surface is placed; a second pressing member, for downwardly pressing the document being placed on the second transparent member; a pathway cover, for covering an upper side of the second pressing member; and an image reading device, moving under the second transparent member for reading an image recording surface of the document.

According to an exemplary embodiment, the first pressing member and the second pressing member are integrally formed.

According to an exemplary embodiment, the feeding tray is formed on the pathway cover for stacking the document. The discharging tray for stacking the document after being read is formed above a downstream position in the first transportation direction. An upstream portion of the feeding tray in the first transportation direction serves as a stacking device for the document that has been read.

According to an exemplary embodiment, the pathway cover has a document stopper body located at the most rear part of the feeding tray.

According to an exemplary embodiment, the document stopper body is capable of being stored at the most rear part of the feeding tray.

With this structure of the exemplary embodiment, the first rotation driving member for separating and conveying one sheet of a plurality of the documents stacking on the discharging tray in the first transportation direction (approaching to the reading position) and the second rotation driving member located oppose to the reading position for reversing the transportation direction of the document and conveying the document in the second transportation direction are disposed on the body of the document feeder. The first contacting member and a plurality of the second contacting members are disposed on a pathway cover, and the pathway cover is rotatable with respect to a rotation shaft located closer to the discharging tray than the feeding tray and far away from the second rotation driving member. In the case when the pathway cover is opened, the first and second contacting members can part from the first and second rotation driving members, respectively. Since at least a portion of the document transportation pathway is exposed, the contacts between the first rotation driving member and the first contacting member and between the contact portion of the second rotation driving member and the second contacting member can be released, respectively. Thus, a paper jam problem can be easily resolved.

With this structure of the exemplary embodiment, the second rotation driving member comprises a reverse roller. A portion of the peripheral of the reverse roller is arranged facing a reading surface of the reading device. The second contacting member comprises a plurality of following rollers in a resilient contact with the reverse roller. In the case when the cover is opened, at least a part of the plurality of following rollers is parted from the peripheral of the reverse roller. Thus, each of the contacts can be formed or released by closing or opening the pathway cover with respect one rotational center.

With this structure of the exemplary embodiment, since it is easy to drive two driving rollers at the same time, and the contact for each of the driving rollers is with a pad-shaped contacting member, the contact portion can be properly selected.

With this structure of the exemplary embodiment, the pad-like contacting member is pressed towards the driving roller, so that the pressing force can be easily adjusted and the pressing device can a simplified structure.

With this structure of the exemplary embodiment, once the pathway cover is opened rotated with respect to a rotational center located far away from the reverse roller, the two following rollers that are located far away from the rotational center, for example, in the downstream portion (the second transportation direction) and on the peripheral of the reverse roller can be parted from the peripheral of the reverse roller. Thus, a sufficient open space for dealing with paper jam can be provided.

With this structure of the exemplary embodiment, the document sandwiched at the contacting part (nipping portion) of the moveable following roller that resists against the urging force of the spring device and the reverse roller can be easily pulled out regardless of the urging force.

With this structure of the exemplary embodiment, an operator can operate the separating device by using a finger or a tool, such as a screwdriver to make the following roller to part from the peripheral of the reverse roller. Thus, the document can be pulled out with little force and the paper jam problem can be easily solved.

With this structure of the exemplary embodiment, the pull-in chute for drawing the stacked to-be-read document to the reading position and the discharging chute for guiding the document after being read to the discharging tray are arranged adjacent to each other with one configured above the other. Thus, the height of the document feeder can be decreased, and the entire body of the image reading apparatus becomes compact.

With this structure of the exemplary embodiment, the document feeder further comprises at least two second contacting members, arranged in the document conveying direction. At least one of the second contacting members located at the most downstream position in the document conveying direction contacts with the peripheral of the second rotation driving member at a position lower than the highest position of the discharging chute when the pathway cover is closed. Thus, in the case when the document is on the upper side of the second rotation driving member, for example, in the second transportation direction, after the document is U-turned and discharged to the discharging chute and to the discharging tray, the subsequent discharged document can be maintained to discharge under the previously discharged document with its image reading surface facing-up. The stacking order of the discharged document is thus in a correct order.

With this structure of the exemplary embodiment, the document feeder further comprises a guiding member, located between at least one of the second contacting members disposed at the most downstream position in the document conveying and the discharging chute, for upwardly guiding the document from the contact location of at least one of the second contacting members at the most downstream position in the document conveying direction and the second rotation driving member. By using the guiding member, the document can move upward from the contact location of at least one of the second contacting members and the second rotation driving member. Thus, the front of the subsequently discharged document approaches the lower surface of the previously discharged document already stacked on the discharging chute such that the next discharged document is guided to the discharging chute. The stacking order of the discharged document can be maintained in the right order.

With this structure of the exemplary embodiment, the document feeder further comprises an elastic supporting plate, for lifting the document from the contact location of at least one of the second contacting members located at the most downstream position in the document conveying direction and the second rotation driving member, so that the document released from the contact location is conveyed on the elastic supporting plate. The elastic supporting plate is bent downward due to the weight of the document. In this condition, the free end of the document supported upward by the elastic force of the elastic supporting plate is maintained in a substantially horizontal state and is discharged to the discharging chute. Thus, the front of the subsequently discharged document approaches the lower surface of the previously discharged document stacked on the discharging chute, such that the subsequently discharged document is guided to the upper side of the discharging chute. Thus, the stacking order of the discharged document can be further maintained in right order.

With this structure of the exemplary embodiment, the elastic supporting plate has a substantially L-shaped cross-section. A base end of the elastic supporting plate is fixed on an engaging member disposed at the left and the right sides of the second rotation driving member. A free end of the elastic supporting plate that extends and tilts downward is inserted into a slit formed in the engaging member. When the document is conveyed on the elastic supporting plate such that the elastic supporting plate bends downward due to its elastic property, the free end of the elastic supporting plate moves up and down in the slit. Thus, the bending direction of the elastic supporting plate is limited such that the front of the next discharged document is further maintained when approaching the lower surface of the previously discharged document.

With this structure of the exemplary embodiment, the document feeder further comprises a plurality of ribs formed on the inner surface of the pathway cover in a direction perpendicular to the document conveying direction, wherein the ribs are spaced apart. In a case when the elastic supporting plate is arranged between the ribs, the range for moving up and down for the elastic supporting plate becomes large. Thus, the lifting effect of the elastic supporting plate with respect to the discharged document can be further maintained.

With this structure of the exemplary embodiment, the document feeder further comprises a sweeping roller, for sweeping the document upward from a contact location of at least one of the second contacting members at the most downstream position in the document conveying direction and the second rotation driving member. The document released from the contact location is swept upward and the front of the subsequently discharged document approaches the lower surface of the previously discharged document stacked on the discharging chute such that the front of the subsequently discharged document can be guided to the discharging chute. Thus, the stacking order of the discharged document can be further maintained in right order.

With this structure of the exemplary embodiment, the document feeder further comprises a cover-like upper guide member, disposed above at least a portion of the discharging chute. The upstream part of the previously discharged document stacked on the discharging chute is restrained by the lower surface of the cover-like upper guide member such that the document can be stacked in a manner substantially parallel to the discharging chute. Thus, the front of the subsequently discharged document is smoothly guided to the lower surface of the previous discharged document. Thus, the plurality of documents can be stacked in right order.

With this structure of the exemplary embodiment, the document feeder comprises an exposure opening, located under the second rotation driving member for exposing a part of a down-facing image recording surface of the document conveyed in the first transporting direction; a first transparent member, for allowing the part of the document exposed by the exposure opening to slide; and a first reading device, disposed under the first transparent member, for reading the image recording surface of the document.

With this structure of the exemplary embodiment, the document with its image recording surface facing-down conveyed in the second rotation driving member rubs against the first transparent plate in the exposure opening. Thus, the image of the document can be read by the reading device under the first transparent plate.

With this structure of the exemplary embodiment, in order for the part of the document exposed by the exposure opening to become flat, the document feeder further comprises a first pressing member for causing the document to temporarily part from a peripheral of the second rotation driving member. Because the document can be extended parallel to the first transparent plate by the first pressing member, the generation of a skew image read by the reading device is obviated. Thus, the image can be read correctly.

With this structure of the exemplary embodiment, the first pressing member is disposed in the direction perpendicular to the document conveying direction beside both sides of the second rotation driving member. A portion of the first pressing member oppose to the first transparent is substantially flat. Because the first pressing members are at the both sides of the second rotation driving member, the entire width of the document in the image recording region can be maintained substantially flat without increasing the size of the second rotation driving member disposed in the width direction of the document. Thus, the image in the width direction of the document can be read correctly.

With this structure of the exemplary embodiment, at least a part of the first pressing member is suspended by a supporting shaft of the second rotation driving member, so that the lower surface of the first pressing member can be correctly set in a manner to cause the document to temporarily part from the peripheral of the second rotation driving member.

With this structure of the exemplary embodiment, the document feeder further comprises a second transparent member, where the document with a down-facing recording surface is placed; a second pressing member, for downwardly pressing the document placing on the second transparent member; a pathway cover, for covering an upper side of the second pressing member; and an image reading device, moving under the second transparent member for reading an image recording surface of the document. The apparatus for stilling the document and reading the image thereon can be additionally incorporated for carrying a plurality of documents and reading the image thereon to improve the function of image reading.

With this structure of the exemplary embodiment, the first pressing member and the second pressing member are integrally formed, so that it is easy to combine the image readers for still document and for conveying document into one apparatus.

With this structure of the exemplary embodiment, the feeding tray is formed on the pathway cover for stacking the document. The discharging tray for stacking the document after being read is formed above the downstream portion in the first transportation direction. An upstream portion of the feeding tray in the first transportation direction serves as a stacking device for the document that has been read. Thus, the height of the location for stacking the document can be decreased, and the document feeder can become more compact.

With this structure of the exemplary embodiment, a document stopper body is disposed at the most rear part of the feeding tray, so that the front end of the document discharged to the discharging tray above the feeding tray is prevented from slipping down from the most rear part of the feeding tray. The stacking order of the discharged document can be maintained in right order.

With this structure of the exemplary embodiment, the document stopper body is capable of being stored at the most rear part of the feeding tray, so that the document stopper body will not extend beyond the sides of the top of the feeding tray when the apparatus is not in use or the image reader is being packaged. Thus, the apparatus is more compact.

While the invention has been described in detail with reference to the specific embodiments thereof, it would be apparent to those skilled in the art that various changes, arrangements and modifications may be applied therein without departing from the spirit and scope of the invention.

What is claimed is:

1. A document feeder provided on an image reader having a reading device that reads an image of a document of a plurality of documents at a reading position, the document being conveyed in a predetermined conveying direction, the document feeder comprising:
    a substantially U-shaped document transporting pathway, through which the document can pass from a feeding tray to a discharging tray, which is provided above the feeding tray, via the reading position, including:
        a first path, in which the document is conveyed from the feeding tray in a first transportation direction; and
        a second path, in which the document is conveyed toward the discharging tray in a second transportation direction that is opposite to the first transportation direction;
    a separating-transporting device that separates one of the plurality of documents stacked on the feeding tray and conveys the separated document in the first transportation direction, the separating-transporting device including a first rotation driving member and a first contacting member, which are capable of being contacted with each other with flexibility;
    a reverse transporting device that conveys the document, which is conveyed by the separating-transporting device, in the second transportation direction, the reverse transporting device including a second rotation driving member and a second contacting member, which are capable of being contacted with each other with flexibility; and
    an openable pathway cover that defines at least a part the second path, the pathway cover being capable of rotating about a rotational shaft that is provided closer to the discharging tray than the reverse transporting device and being capable of exposing at least the part of the second path, the pathway cover including at least the second contacting member among the first and second contacting members, wherein:
    when the pathway cover is closed, the first contacting member and the second contacting member are contacted with the first rotation driving member and the second rotation driving member, respectively, with flexibility; and
    when the pathway cover is opened, the first contacting member and at least a portion of the second contacting member are separated from the first rotation driving member and the second rotation driving member, respectively.

2. The document feeder according to claim 1, wherein in the second rotation driving member includes a reverse roller, wherein:
    the reverse roller is arranged such that a portion of a peripheral surface of the reverse roller faces a reading surface of the reading device; and
    the second contacting member includes a plurality of following rollers, wherein:
    the plurality of following rollers and the reverse roller are capable of being contacted with each other with flexibility; and
    when the pathway cover is opened, at least one of the plurality of following rollers is separated from the peripheral surface of the reverse roller.

3. The document feeder according to claim 2, wherein:
    the plurality of following rollers include an upstream roller and a downstream roller and are capable of contacting the reverse roller;
    the upstream roller and the downstream roller are disposed upstream and downstream, respectively, from the reading position with respect to the predetermined conveying direction; and
    when the pathway cover is opened, the downstream roller of the plurality of following rollers is separated from the reverse roller.

4. A document feeder provided on an image reader having a reading device that reads an image of a document of a plurality of documents at a reading position, the document being conveyed in a predetermined conveying direction, the document feeder comprising:
    a substantially U-shaped document transporting pathway, through which the document can pass from a feeding tray to a discharging tray, which is provided above the feeding tray, via the reading position, including:
        a first path, in which the document is conveyed from the feeding tray in a first transportation direction; and
        a second path, in which the document is conveyed toward the discharging tray in a second transportation direction that is opposite to the first transportation direction;
    a separating-transporting device that separates one of the plurality of documents stacked on the feeding tray and conveys the separated document in the first transportation direction, the separating-transporting device including a first rotation driving member and a first contacting member, which are capable of being contacted with each other with flexibility;
    a reverse transporting device that conveys the document, which is conveyed by the separating-transporting device, in the second transportation direction, the reverse transporting device including a second rotation driving member and a second contacting member, which are capable of being contacted with each other with flexibility; and
    an openable pathway cover that defines at least a part the second path, the pathway cover being capable of rotating about a rotational shaft that is provided closer to the discharging tray than the reverse transporting device and being capable of exposing at least the part of the second path, the pathway cover including at least the second contacting member among the first and second contacting members, wherein:
    when the pathway cover is closed, the first contacting member and the second contacting member are contacted with the first rotation driving member and the second rotation driving member, respectively, with flexibility,
    when the pathway cover is opened, at least a portion of the second contacting member is separated from the second rotation driving member, the reverse roller is arranged such that a portion of a peripheral surface of the reverse roller faces a reading surface of the reading device, the second contacting member includes a plurality of following rollers, the plurality of following rollers and the reverse roller are capable of being contacted with each other with flexibility, when the pathway cover is opened, at least one of the plurality of following rollers is separated from the peripheral surface of the reverse roller, the plurality of following rollers include an upstream roller and a downstream roller and are capable of contacting the reverse roller, the upstream roller and the downstream roller are disposed upstream and downstream, respectively, from the reading position with respect to the predetermined conveying direction, when the pathway cover is opened, the downstream roller of the plurality of following rollers is separated from the reverse roller, and the upstream roller of the plurality of following rollers is provided to a movable frame that is disposed on a body side of the document feeder, wherein the frame is urged by a spring member so that the upstream roller is pressed against the reverse roller.

5. The document feeder according to claim 4, further comprising a separating device that separates the upstream roller from the reverse roller.

6. The document feeder according to claim 1, wherein:
the first rotation driving member includes at least two driving rollers that are disposed apart from each other in the predetermined conveying direction;
the first contacting member includes at least two pad-like portions; and
the at least two pad-like portions and the at least two driving rollers are capable of being contacted with each other with flexibility.

7. The document feeder according to claim 6, wherein the first contacting member is urged toward each of the at least two driving rollers via a pressing device, at an inside of the pathway cover.

8. A document feeder provided on an image reader having a reading device that reads an image of a document of a plurality of documents at a reading position, the document being conveyed in a predetermined conveying direction, the document feeder comprising:
a substantially U-shaped document transporting pathway, through which the document can pass from a feeding tray to a discharging tray, which is provided above the feeding tray, via the reading position, including:
a first path, in which the document is conveyed from the feeding tray in a first transportation direction; and
a second path, in which the document is conveyed toward the discharging tray in a second transportation direction that is opposite to the first transportation direction;
a separating-transporting device that separates one of the plurality of documents stacked on the feeding tray and conveys the separated document in the first transportation direction, the separating-transporting device including a first rotation driving member and a first contacting member, which are capable of being contacted with each other with flexibility;
a reverse transporting device that conveys the document, which is conveyed by the separating-transporting device, in the second transportation direction, the reverse transporting device including a second rotation driving member and a second contacting member, which are capable of being contacted with each other with flexibility; and
an openable pathway cover that defines at least a part the second path, the pathway cover being capable of rotating about a rotational shaft that is provided closer to the discharging tray than the reverse transporting device and being capable of exposing at least the part of the second path, the pathway cover including at least the second contacting member among the first and second contacting members, wherein:
when the pathway cover is closed, the first contacting member and the second contacting member are contacted with the first rotation driving member and the second rotation driving member, respectively, with flexibility; and
when the pathway cover is opened, at least a portion of the second contacting member is separated from the second rotation driving member,
wherein the pathway cover includes:
a drawing chute that draws the document from the feeding tray, and
a discharging chute that is provided at a position that is higher than a position where the drawing chute is provided, and guides the document, which was conveyed by the reverse transporting device, to the discharging tray.

9. The document feeder according to claim 8, wherein:
the second contacting member includes at least third and forth contacting members that are disposed downstream from the reading position with respect to the predetermined conveying direction;
the forth contacting member is disposed at a most downstream position, among the at least third and fourth contacting members, with respect to the predetermined conveying directions; and
when the pathway cover is closed, the forth contacting member and the second rotation driving member are contacted with each other at a position that is lower than a highest portion of the discharging chute.

10. The document feeder according to claim 9, further comprising a guiding member that guides the document to a position that is higher than a position where the forth contacting member and the second rotation driving member are contacted with each other, the guiding member being disposed between the forth contacting member and the discharging chute.

11. The document feeder according to 10, further comprising an elastic supporting member that lifts the document to a position that is higher than a position where the forth contacting member and the second rotation driving member are contacted with each other.

12. The document feeder according to claim 11, wherein the elastic supporting member has a substantially L-shape in section, wherein:
a base end of the elastic supporting member is fixed on an engaging member that is disposed at sides of the reverse roller in a direction perpendicular to the predetermined conveying direction; and
a free end of the elastic supporting member that extends diagonally downward is inserted into a slit provided in the engaging member.

13. The document feeder according to claim 12, further comprising at least two ribs provided on an inner surface of the pathway cover, wherein:
the at least two ribs extend in a direction perpendicular to the predetermined conveying direction;

the at least two ribs are disposed apart from each other; and the elastic supporting member is disposed between the at least two ribs.

14. The document feeder according to claim 10, further comprising a sweeping roller that lifts the document to a position that is higher than a position where the forth contacting member and the second rotation driving member are contacted with each other.

15. The document feeder according to claim 10, further comprising a cover-like upper guide member disposed above at least a portion of the discharging chute.

16. The document feeder according to claim 1, further comprising:
- a document exposing portion that is provided under the second rotation driving member to expose a surface of the document that is being conveyed in the first transportation direction, the document exposing portion having an opening;
- a first transparent member, with which the surface of the document contacts while the document is being conveyed; and
- a first reading device that is disposed under the first transparent member and reads an image of the surface of the document through the opening.

17. The document feeder according to claim 16, further comprising a first pressing member that temporarily separates a portion of the document, which is being conveyed by the second rotation driving member, from the peripheral surface of the second rotation driving member, at the document exposing portion from which the portion of the image recording surface of the document is exposed, the first pressing member making the portion of the document flat at the opening.

18. The document feeder according to claim 17, wherein the first pressing member is disposed each side of the second rotation driving member in a direction perpendicular to the predetermined conveying direction,
wherein each of the first pressing member includes a substantially plate-like portion at a portion that faces the first transparent member.

19. The document feeder according to claim 18, wherein at least a part of each of the first pressing member is suspended from a supporting shaft of the second rotation driving member.

20. The document feeder according to claim 19, further comprising:
- a second transparent member, on which the document can be placed with the image recording surface down;
- a second pressing member that is capable of pressing the document placed on the second transparent member from above;
- a document cover that is capable of covering an upper side of the second pressing member; and
- a second image reading device that is capable of moving under the second transparent member in order to read the image recording surface of the document.

21. The document feeder according to claim 20, wherein the first pressing members and the second pressing member are integrally provided.

22. The document feeder according to claim 20, wherein:
the feeding tray, which supports a stack of the plurality of documents, is provided at an upper surface of the document cover;
the discharging tray, which supports a stack of the plurality of documents that have been read, is provided above a downstream portion of the feeding tray with respect to the first transportation direction; and
an upstream portion of the feeding tray serves as a supporting portion that supports the plurality of documents that are before and after being read.

23. The document feeder according to claim 20, wherein the document cover has a document stopper at a most downstream end of the feeding tray with respect to the second transportation direction.

24. The document feeder according to claim 23, wherein the document stopper is capable of being stored at the most downstream end of the feeding tray.

25. The document feeder according to claim 1, wherein the rotational shaft is disposed upstream of the first rotation driving member in the first transportation direction.

* * * * *